US009665833B2

(12) United States Patent
Smith et al.

(10) Patent No.: US 9,665,833 B2
(45) Date of Patent: May 30, 2017

(54) SYSTEM AND METHOD FOR PROVIDING COLLABORATION COMMUNITIES IN A COMPUTER PORTAL ENVIRONMENT

(75) Inventors: Gregory P. Smith, Westminster, CO (US); Shane Pearson, Boulder, CO (US); Timothy Breeden, Boulder, CO (US); Chris Jolley, Lone Tree, CO (US); Brodi Beartusk, Lafayette, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1985 days.

(21) Appl. No.: 11/388,606

(22) Filed: Mar. 24, 2006

(65) Prior Publication Data
US 2006/0218000 A1  Sep. 28, 2006

Related U.S. Application Data

(60) Provisional application No. 60/664,760, filed on Mar. 24, 2005.

(51) Int. Cl.
| | |
|---|---|
| *G06Q 30/02* | (2012.01) |
| *G06Q 10/10* | (2012.01) |
| *G06Q 10/06* | (2012.01) |
| *G06Q 30/06* | (2012.01) |
| *G06Q 10/08* | (2012.01) |
| *G06Q 10/00* | (2012.01) |

(52) U.S. Cl.
CPC .......... *G06Q 10/00* (2013.01); *G06Q 10/101* (2013.01)

(58) Field of Classification Search
CPC .............................. G06Q 10/101; G06Q 10/00
USPC ..................................... 705/1.1–912
See application file for complete search history.

(56) References Cited

U.S. PATENT DOCUMENTS

| | | | |
|---|---|---|---|
| 6,519,629 B2* | 2/2003 | Harvey et al. ................. | 709/204 |
| 6,643,654 B1* | 11/2003 | Patel et al. ....................... | 707/10 |
| 2002/0049788 A1* | 4/2002 | Lipkin et al. ................... | 707/513 |
| 2002/0059425 A1* | 5/2002 | Belfiore et al. ............... | 709/226 |
| 2003/0154232 A1* | 8/2003 | Beringer et al. ............. | 709/102 |
| 2003/0163547 A1* | 8/2003 | Beisty et al. ................. | 709/217 |
| 2004/0153508 A1* | 8/2004 | Alcorn et al. ................. | 709/205 |
| 2004/0153509 A1* | 8/2004 | Alcorn et al. ................ | 709/205 |
| 2006/0004703 A1* | 1/2006 | Spivack et al. ................... | 707/2 |

* cited by examiner

*Primary Examiner* — Jonathan Ouellette
(74) *Attorney, Agent, or Firm* — Tucker Ellis LLP

(57) ABSTRACT

A system and method for providing collaboration communities in a computer portal environment. The system comprises a community portal tool for creating community portals, portal applications, or portal web applications. In one embodiment, the portal can be one of a number of enterprise applications on server software. The portal can include a community context that can have an indication of members of the community. The indication can be, for example, a list of the members or pointer to a list of members. The community portal can be constructed from portal elements and the community context. The community portal tool can also be used to select a community portal template from a portal component library. The template can include standard elements from the construction of a community portal. A standardized look and feel, layout, and components such as a calendars can be in a community template.

20 Claims, 15 Drawing Sheets

SYSTEM AND METHOD FOR PROVIDING COLLABORATION COMMUNITIES IN A COMPUTER PORTAL ENVIRONMENT

CLAIM OF PRIORITY

This application claims the benefit of U.S. Provisional Patent Application entitled "COLLABORATION COMMUNITIES"; Application No. 60/664,760; filed Mar. 24, 2005, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computer portal environments, and particularly to a means for enabling collaboration communities among users and entities in such environments.

BACKGROUND

Portals are computer-based environments that can provide access to information networks and/or sets of services through the World Wide Web or other computer networks. A portal can present a unified and personalized view of enterprise information to employees, customers, and business partners. In many implementations, portal applications can include web application views designed as a portal.

In some instances, portals are capable of presenting multiple web application views within a single web interface. In addition to regular web content that can appear in a portal, portals provide the ability to display portlets (self-contained applications or content) in a single web interface. Portals can also support multiple pages with menu-based or custom navigation for accessing the individualized content and portlets for each page.

However, to date, even though portals are used to communicate content, there have been no readily available tools for allowing collaboration between users in a portal environment, nor are there are any easy means of creating collaboration communities in a portal environment. This is the area the invention addresses.

SUMMARY

Disclosed herein is a system and method for providing collaboration communities in a computer portal environment. The system comprises a community portal tool for creating community portals, portal applications, or portal web applications. In one embodiment, the portal can be one of a number of enterprise applications on server software. The portal can include a community context that can have an indication of members of the community. The indication can be, for example, a list of the members or pointer to a list of members. The community portal can be constructed from portal elements and the community context. The community portal tool can also be used to select a community portal template from a portable component library. The template can include standard elements from the construction of a community portal. A standardized look and feel, layout, and components such as a calendars can be in a community template.

BRIEF DESCRIPTION OF THE FIGURES

FIG. 10 illustrates links to Visitor Tools.

FIG. 11 illustrates a community editor in the Visitor Tools.

FIG. 12 illustrates a Create community form in Visitor Tools.

DETAILED DESCRIPTION

Portals are computer-based environments that can provide access to information networks and/or sets of services through the World Wide Web or other computer networks. A portal can present a unified and personalized view of enterprise information to employees, customers, and business partners. In many implementations, portal applications can include web application views designed as a portal.

In some instances, portals are capable of presenting multiple web application views within a single web interface. In addition to regular web content that can appear in a portal, portals provide the ability to display portlets (self-contained applications or content) in a single web interface. Portals can also support multiple pages with menu-based or custom navigation for accessing the individualized content and portlets for each page.

An embodiment of the present invention provides a community portal system, comprising a tool adapted for a person to create a community portal, the tool allowing the creation of a community context, the community context including an indication of members, the tool allowing the creation of a community portal constructed from portal elements including portlets; and the community portal using the community context and portal elements, the community portal allowing access to community members. Embodiments may also including portlets.

A working portal can be defined by a portal configuration. The portal configuration can include a portal definition such as a file including Extensible Markup Language (XML); portlet definition files for any portlets associated with the portal; java server pages (JSPs); web application descriptors; images such as graphics interchange format files (GIFs); deployment descriptors, configuration files, java archive files (JAR) that contain the logic and formatting instructions for the portal application; and any other files necessary for the desired portal application.

Portlets can be implemented as java server pages (JSPs) referenced by XML based metadata of the portal descriptor. Portlets can utilize various types of display code to display highly focused information directed to a specific user or user group, having a portal as its container. Portlets can be comprised of portlet components which include portlet attributes (i.e. whether the portlet is editable, floatable, minimizable, maximizable, helpable, mandatory, has defaults minimized, or whether login is required) and portlet layout elements or components (i.e. banner, header, content, and footer sections).

Embodiments of the present invention concern the creation of a collaboration or community portal using portal elements.

Figure 1:
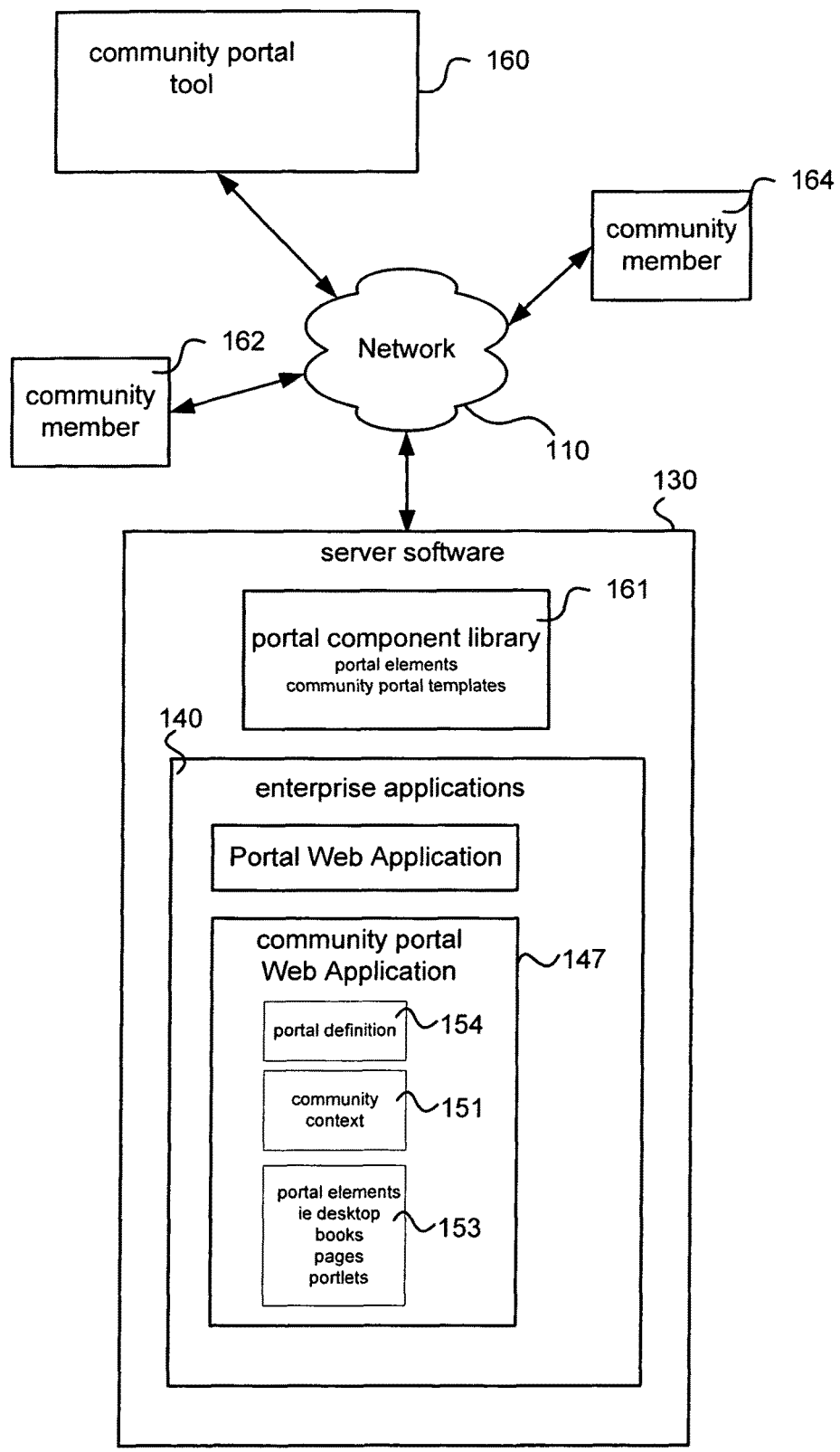
FIG. 1 is an illustration of a community portal system of one embodiment.

FIG. 1 illustrates a community portal tool 160 for creating community portals. In one embodiment, the community portal web application 147 can be one of a number of enterprise applications 140 on server software 130. The server software 130 can be, for example, the WebLogic Server™ product available from BEA Systems, Inc., of San Jose, Calif. The community portal application 147 can include a community context 151 that can have an indication of members of the community. The indication can be, for example, a list of the members or pointer to a list of members. The community portal tool 160 can allow the creation of a community portal. The community portal can be constructed from portal elements 153 and the community context 161. The community portal web application can also include a portal definition 154 which can include the community context 151 or a pointer to the community context 151.

The community portal tool 160 can be used to select a community portal template from the portable component library 161. The template can include standard elements from the construction of a community portal. A standardized look and feel, layout, and components such as a calendars can be in a community template.

Different clients such as community members 162 and 164 can have access to the community portal. The server software 130 can check to see whether the community members 162 and 164 are actually members as indicated by the community context 151. If the clients are community members, the community portal can be dynamically constructed for the community member.

The community portal tool 160 or the constructed community portal can allow invitations to be sent to potential community portal members. The invitation can be sent by email, internet messaging (IM), or some other system. In one embodiment, messages can be sent to a portlet to another web page associated with the use of notification. The community portal can include a number of portlets which are useful for community functions, such as a calendar functions and the like. A desktop, or top level portal element, can store an indication that the portal is a community portal. This indication can be checked to determine whether the server software needs to determine whether a person has a community member before displaying the community portal.

Notification can be sent to the community members when a community portal content is changed. The notification can be done by email, instant messaging, or by a message to a portlet at a portal page to which the community member has access.

In accordance with an embodiment, community portals can use information in databases. This allows the community context to be easily be updated with membership information and the like.

Figure 2:
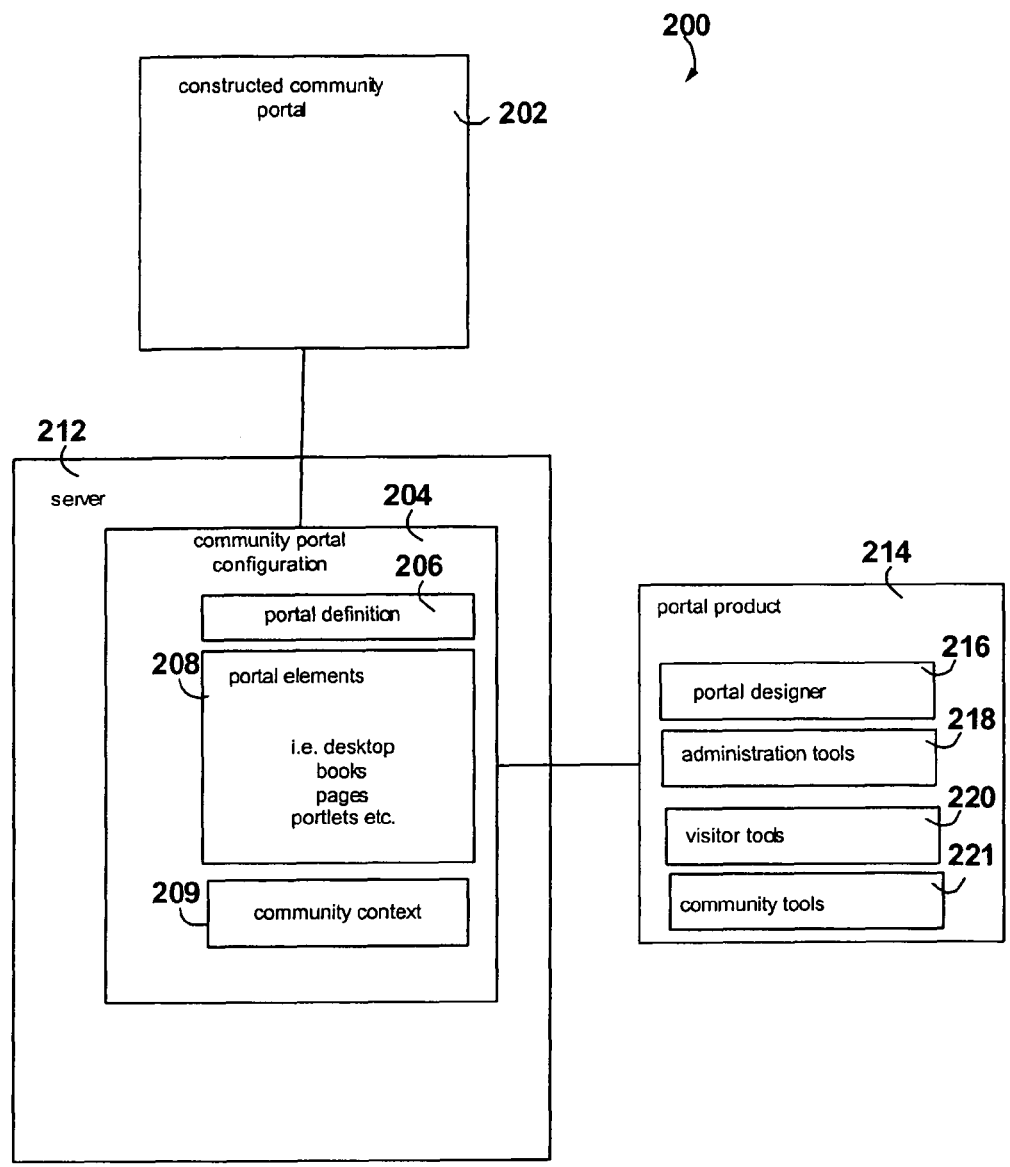
FIG. 2 is an illustration of a community portal system of one embodiment.

FIG. 2 shows a functional diagram 200 in which the community portal configuration 204 including a portal definition 206, portal elements 208 and community context 209 is used to construct a community portal 202. The community tools 221 can be part of a portal product 214 so the product can also include portal designer 216, administration tool 218 and visitor tools 220. The community tools 221 can be similar to visitor tools and portal designer tools in the functionality with added functionality to construct the community portals. The added functionality can include functionality to create and update the community context 209.

Figure 3A:
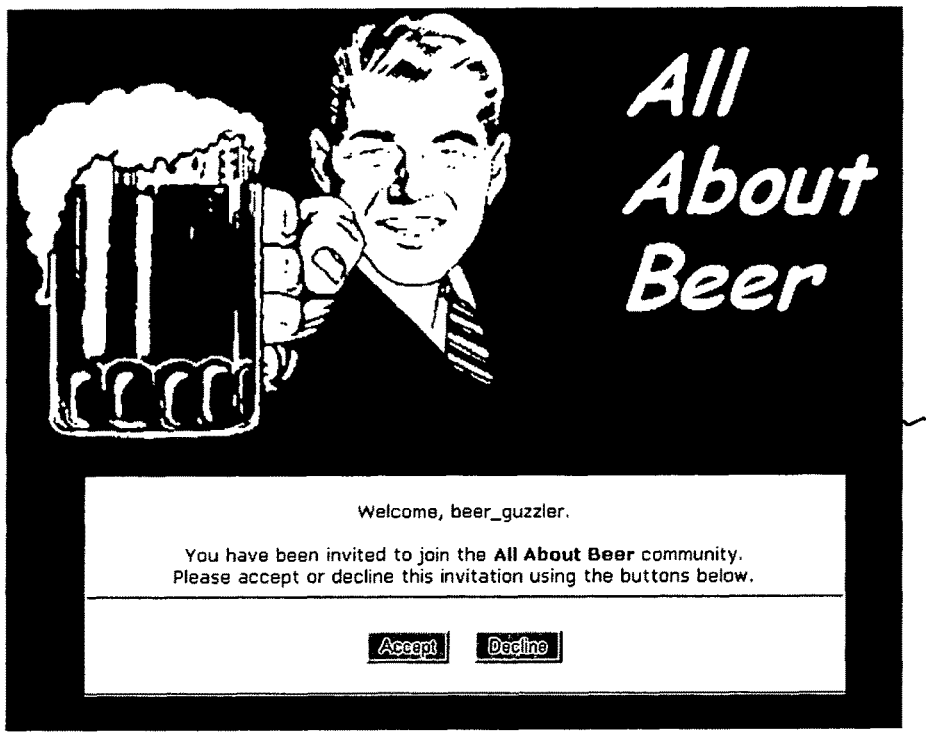
FIG. 3A-3B illustrates community portal pages of one embodiment.
Figure 3B:
Figure 3B:
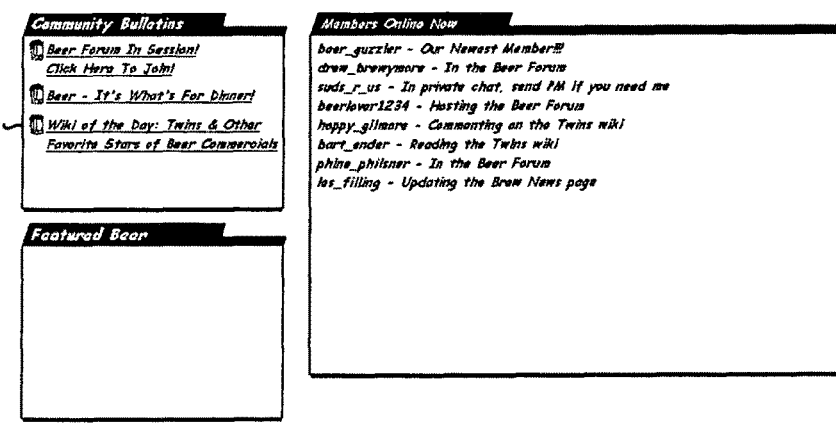

FIG. 3 illustrates an exemplary constructed community portal page. FIG. 3A illustrates an exemplary invitation page 230. This invitation page can be one of a number of standard pages whose URLs are associated with the community portal. Other standard URLs can include registration URLs and URLs to indicate a closed community portal. FIG. 3B illustrates an exemplary community portal page 232 which includes a number of portlets 234, 236, such as a members online portlet and community bulletin portlet. Other portlets can include functionality useful for communities, such as calendars.

Exemplary Embodiment

The following are details of one embodiment of a computer community portal system. This example below is merely exemplary and not meant to limit the general concept or scope of the invention. For example, words such as should, must and will or definitions of terms used below for the following example are merely meant to describe one embodiment, but are not meant to limit the invention as a whole.

In accordance with an embodiment, communities can provide a way to define access to areas of a portal. The customer value of communities can come from empowering end users and non-technical business users with the ability to quickly and easily define an area where they can choose the applications and content to make available and the people who can participate—without requiring anyone from an information technology (IT) department.

Communities can be the base level for collaboration in a portal using the current definitions of the market. They can provide a sub-container within a portal to provide access to applications and content to a specific group of people.

Communities can be broken down into 3 sub-areas:

Community Framework: This can be a desktop with additional features to support portal resource grouping and management by end users.

Community Context: This enables application inside the community to be aware of services and resources scoped to the community.

Community Template(s): These are templates used to generate Communities. They can include a collection of Portlets such as Document Library, Self Registration, Group Calendar, etc. that allow customers to quickly create Communities.

Communities can also provide the capability for end users to create a new area or sub-area and make it available automatically to all other portal users:

End users can create desktops.

Administrators can have a selection on the desktop properties to make community creation available to specific roles on a per desktop basis.

In accordance with an embodiment, the end user can use one of a number of roles including:

Community Member

The Community Member can be a visitor with access rights to a community, but no administration privileges. This user can use a variation of the Visitor Tools that allow for customization of their personal pages, but need not have rights to modify the community pages.

Community Leader

The Community Leader is a special case of the Community Member who can make changes to the community assets, effectively acting as an administrator. However, it should be noted that this user need not be an administrator in the same sense as the users of the Administration Portal. Community Leader tools can be enhancements and/or extensions to the Visitor Tools, rather than a separate set of tools. These tools can be made available only when a desktop is a community, and only when the user has Community Leader privileges (via entitlements) for that community. All Community Leaders are by default Community Members for the communities that they are leaders of. Community Leaders can add or remove Community Members.

Community Creator

The Community Creator is a user who has the ability to create new communities. Users in this role can have access to tools for creating a new community, at which point they become a Community Owner. The Community Creator confers no other privileges beyond the ability to create communities.

Community Owner

The Community Owner is a Community Creator who has created a community and is now the singular owner of it. This user can be the only one that may retire the community, delete the community, or otherwise modify its lifecycle. A Community Owner can always be a Community Leader of the communities that they are the owner of. Community Owners can add or remove Community Leaders.

Community membership can have the following classifications:

Invited

This is a community member who has been invited to join a community but who has not yet accepted and registered. This user may be further classified as follows:

Internal—A user who is already in the security system, who can be identified by their user ID.

External—A user who is not in the security system, who can be identified by their email address.

Registered

This is a community member who has joined a community by registering/logging-in. These users can be "known" to the community for the purposes of messaging, collaboration, etc. They can be further classified as follows:

Offline—A user who is not currently logged into the server.

Online—A user who is logged into the server but not currently accessing a community.

Present—A user who is logged into the server and currently accessing a community.

Community Profiles can be a User/Group profile scoped to a particular Community.

Community Creator Use Cases

These use cases are for the Community Creator, as described in the users section.

Community Creator Creates a New Community

This use case covers the creation of a new community by a user who has the right to do so. It should be noted that this need not be an administrative function that is to be carried out using the Administration Portal, rather an end user can be able to do this while logged into an existing community. Given that the user has the right to do so and is logged into an existing community, the following can be the actions to be taken to create a new community:

Community Creator elects to create a new community

Community Creator can be asked to provide the following information:

Name of the new community

Partial URL for the new community

Description of the new community (optional)

Meta data for the new community (optional)

Community Creator can supply the data and continues to the next step.

Community Creator is asked to select from a list of available community templates. This list can be pruned according to their access privileges.

Community Creator selects the template and continues to the next step.

System creates the new community and makes the Community Creator the Community Owner.

Community Owner is directed to the newly created community.

The use case above covers a simple sequence for creating a new community. A more complex sequence can involve the selection of community members, modification of community resources, etc., as part of a wizard.

Community Owner Adds or Removes Community Leaders.

This use case covers the addition of members to the Community Leader role. A checkbox can be provided next to the members in a page that indicates whether or not they are to be made a Community Leader. Only currently registered members would be eligible, and making them a Community Leader can add or remove them from the appropriate role.

Community Owner elects to edit the community.

Community Owner elects to add users to the Community Leaders role.

System updates the Community Leader entitlements accordingly.

Community Owner Removes Community Leaders

This use case covers the removal of members to the Community Leader role and is complimentary to the previous use case for adding Community Leaders.

Community Owner elects to edit the community.

Community Owner elects to remove users from the Community Leaders role.

System updates the Community Leader entitlements accordingly.

Community Owner manages community lifecycle.

Community Owner deactivates a Community.

This use case covers the deactivation of a community by the Community Owner, which makes it unavailable to all other users. Note that this need not remove the community, it simply controls whether or not users may access it. The following are the steps that the Community Owner can perform to deactivate a community:

Community Owner elects to edit the community.

Community Owner elects to deactivate the community.

System updates the Community Leader and Community Member entitlements accordingly.

System provides and indicator that the community is currently deactivated.

Note that the Community Owner can still have access to the community at this point, so the indicator is used to let them know the state.

Community Owner Reactivates a Community

This use case covers the reactivation of a currently deactivated community, and is complimentary to the previous use case. The following are the steps that the Community Owner can perform to reactivate a community.

Community Owner elects to edit the community.

System provides an indicator for the current deactivated state of the community.

Community Owner elects to reactivate the community.

System updates the Community Leader and Community Member entitlements accordingly.

System changes the indicator to indicate that it is currently active.

Community Owner Sets the Time-to-Live for a Community

This use case covers setting and modification of the time-to-live for a community, which determines at which point the community is automatically deactivated.

Community Owner Deletes a Community

This use case covers the explicit removal of the community by the Community Owner, which makes it no longer accessible to any users, including the owner. The following are the steps that a Community Owner can take when deleting a community:

Community Owner elects to edit the community.

Community Owner elects to delete the community.

System makes the community unavailable to end users.

System or Administrator physically removes the community and its resources.

Community Owner Creates a Template from the Community

This use case covers the creation of a template for an existing community by the Community Owner. These templates may be used by Community Creators to create new communities that provide a standard look and feel, initial set of applications, etc. For example, a company may require that all communities be created from a common template.

This template can be a template representation stored in database. This can prevent the creation of portal files by non-administrators/non-developers, and to allow for the support of templates when the app is deployed a repository, such as an EAR. The steps that the Community Owner uses to create a template are as follows:

Community Owner elects to edit the community.

Community Owner elects to create a template for the community.

System presents a form with the following fields:

Name of the template

Description of the template

Toggle to indicate if template is to be shared.

Community Owner supplies information and accepts or cancels the creation.

System creates the template using the current community and supplied information.

If the template is to be shared, the following additional steps can be done:

System presents a form with a list of all users with Community Creator status.

Community Owner selects from the list to indicate who to share the template with.

System sets the entitlements to allow specified users to access the new template.

Community Leader Manages an Existing Community

These use cases cover the changes that a community leader can make to a community using tools that are not available to standard community members. The tools for making these changes can easily accessible and easy to use, as these users are not administrators and are instead much more like the traditional "visitor" class of users.

Community Leader Manages General Properties

This use case covers the changes to the general properties of the community by the leader. These can include the following:

Community Leader elects to modify the properties for the community.

System presents the current values and controls for modifying the following:

Display name (title)

Description

Meta Data

Community Leader modifies the properties and elects to save the changes.

System updates the properties with the new values.

Community Leader Manages Look and Feel

This use case covers the changes that the community leader can do when managing the look and feel for a community:

Community Leader elects to modify the community.

Community Leader elects to change the look and feel for the community.

System displays the settings and controls for changing the following:

Look and feel

Shell

Menu for the main book

Community Leader modifies the values using the controls.

Community Leader elects to save the changes.

System modifies the community using the changed values.

Community Leader modifies the URL.

Community Leader Manages Site Structure

This use case covers the changes to the site structure by the community by the leader. The requirements can be basically the same as those for a visitor modifying a desktop, including the following:

Community Leader elects to manage the site structure.

System displays the current site structure, including editors for the following:

Pages within the main book

Portlets/books within the pages

Community Leader may elect to do the following to the main book

Add pages, including

New blank pages

Existing pages from the library

Remove pages

Move pages (reorder)

Select the theme for the book

Community Leader may elect to do the following for each for the pages:

Modify the display name for the page (title)

Modify the description for the page

Select the layout for the page

Select the theme for the page

Modify the page contents, including:

Adding/removing portlets

Adding/removing books

Changing the position of the pages/books on the page

Community Leader elects to save the changes

System updates the community with the changed values.

Community Leader Manages the Shared Pages

This use case covers the shared pages in a community that are accessible by all members, but editable only by the community leader(s). These pages can contain the various portlets that provide for collaboration between community members. The following tasks are those that the community leader can do when managing the shared pages:

Community Leader elects to modify the community.

Community Leader elects to create a new shared page.

System presents a list of available page templates, including a blank page.

Community Leader selects the template or blank page.

System adds the new page to the community.

Community Leader may elect to modify the newly added page.

Community Leader elects to modify the community.

Community Leader elects to modify a shared page.

System presents page editor with controls for the following:

Modify the display name for the page (title)

Modify the description for the page

Select the layout for the page

Select the theme for the page

Modify the page contents, including:

Adding/removing portlets

Adding/removing books

Changing the position of the pages/books on the page

Modify the page sharing, which is one of the following:

Shared with other users.

Not shared with other users.

Community Leader elects to save the changes

System updates the community with the changed values.

Community Leader previews changes:

Community Leader changes Public Resources and Previews changes.

Community Leader accepts changes in which case the Preview Version goes live.

Community Leader Rejects changes—in which case the Changes are lost.

Community Leader Saves Changes—in which case the changes are saved but not made Public.

Community Leader Enables Personal Page.

This use case covers the personal pages that are optionally available to community members. The community leader may allow the members to create their own personal pages, which are distinct from the shared pages. The following tasks are those that the community leader can be able to do when managing the personal pages:

Community Leader elects to modify the community.

Community Leader elects to modify the personal pages settings.

System presents list of users and their current permissions.

Community Leader changes the permissions for each user to indicate whether or not they may have personal pages Community Leader elects to save changes.

System updates the entitlements accordingly.

Community Leader Manages Membership

These use cases cover the membership management tasks by a community leader, including the addition and removal of Community Members.

Community Leader Adds Internal Users

This use case covers the addition of internal users, such as from LDAP, to an existing community. These users are already known to the system and are added to a group that is directly associated with the community. This group has access rights to the community, but these users may have different capabilities when using the portal.

As with the applications this feature can be implemented with entitlements, such as with an entitlement granting access to the community for all members of a specific role. The Community Leader need not know the specifics, and instead can be focused only on adding or removing the users and/or groups. Whatever the actual implementation, the Community Leader need not create or otherwise manage the groups or roles directly.

The following tasks are those that the Community Leader can do when adding internal users:

Community Leader elects to edit the community.

Community Leader elects to add users to the community.

Community Leader specifies that the users to be added are internal.

System displays the following:

List of available users, groups, and roles from the internal system

List of currently selected users, groups, and roles

Community Leader uses these lists and associated controls to do the following:

Add users, groups, or roles from the available list to the selected list

Removes users, groups or roles from the selected list

System updates the entitlements accordingly.

Users are notified of membership in community. (Optional)

Community Leader Adds External Users

This use case covers the addition of external users to a community, which can be quite different from the previous use case for internal users. While internal users are "known" to the system, making it possible to use standard user/group/security/entitlements, the external users are completely unknown. These users will be invited to join a community and if they elect to do so, will become known.

This use case will be similar to that for self registration in that the users will be required to sign in to gain access to the community. It differs in that only the invited users will be allowed to join, with the system checking that the user has the proper invitation. The invitation and validation mechanism should be similar to those used by existing internet sites with community-like functionality.

The selection of users and sending of invitations can be as follows:

Add storyboard around multiple invites, etc.

Community Leader elects to edit the community.

Community Leader elects to add users to the community.

Community Leader specifies that the users to be added are external.

System displays a form for entering the email addresses of invitees.

Community Leader enters email addresses.

System emails invitations.

The use cases for a Community Member joins an existing community are related to this use case and will cover the actions taken when the invitation has been received.

Community Leader Sets Permissions for Users

This use case covers the setting of permissions that apply to Community Members by the Community Leader. As with other parts of the system, these permissions can be via entitlements, but this can be entirely transparent to the Community Leader. The permissions can be provided as a fixed set in a default community, but may be extended by developers using the management framework.

Community Leader Enables Self Registration

This use case covers the enabling/disabling of the self-registration functionality by the Community Leader. Self-registration can allow end users to become Community Members by registering themselves with no assistance or actions by the Community Leader or other users.

In one embodiment, there are two variations on this, basically that of known versus unknown users, with the former being related to the previous use case for adding external users. These users will join the community, but they should have the proper credentials to do so. The unknown users are anyone who can access the site, effectively allowing an anonymous user to become a Community Member. In both cases the actions will be the same for the user, with only the underlying system being different. These actions can include:

Community Leader elects to edit the community.
 Community Leader elects to enable self registration.
 System sets entitlements to allow for self registration.

Community Leader Removes Users

This use case covers the removal of users in a community by the Community Leader. There are two variations on this to cover the internal and external users. Internal users and external users who have joined the community are essentially the same in that in both cases a known user is available to be removed by setting the entitlements accordingly. External users who have not joined are different in that no user account yet exists for them, so instead they are removed from the list of invitees. The actions by the Community Leader can include the following:

Community Leader elects to edit the community.
 Community Leader elects to remove users to the community.
 System displays a list of registered and invited users.
 Community Leader selects registered and/or invited users to remove.
 System sets entitlements and/or removes invitees.

Community Member Searches and Discovers Communities

In this case, within a given Web Application, Users are able to search for Public communities based upon the metadata of the community.

Community Member Receives an Invitation to Join a Community

These use cases describe several types of delivering invitations to join a community. They should not be considered to be exhaustive.

Community Member Receives an Alert Inviting them to Join a Community

User Logs into Portal
 User is shown an alert that they have been invited to join a community.

Community Member Receives an Email Inviting them to Join a Community

User receives an email inviting them to join a Community X.
 User clicks on the link in the email and it takes the user to the Registration page.

Community Member is Otherwise Notified of an Invitation to Join a Community

Examples:
 Instant Message
 Text Message
 Etc.

Community Member Joins an Existing Community
Internal Users
 Through Invitation
  User clicks on URL on Invitation
  User activates membership
  User receives email notification of activation
 Through Browsing/Searching
  User locates Community Sign Up Page
  User add User Name to list of Community Members
  System validates name against Authentication Provider
  User receives Notification of Community Sign Up.
External Users
 Through Invitation
  User clicks on URL on Invitation
  User registers.
  User activates membership by entering in User Properties. This may include filling out a Community Profile that might contain elements like: Notification Consent, etc.
  User receives email notification of activation
 Through Browsing/Searching
  User locates Community Sign Up Page
  User Registers
  User adds User Name to list of Community Members.
  User receives Notification of Community Sign Up.

Community Member Manages Personal Pages

This use case describes Community Members managing their Personal Pages on a site. A Personal Page can function like any Portal Application, except for that the only resources that are available are those made available by the Community Leader. Community Member adds Books and Portlets to Personal Page(s). The list of resources available it dictated by the resources made available by the Community Leader and by Entitlements.

Administration Use Cases

These use cases cover the administration of communities by users of the Administration Portal, including standard administrators and business analysts.

Administrator Creates a Community

This use case covers the creation of a new community by an administrator using the Administration Portal, which is very similar to creating a desktop, with the following actions:

Administrator elects to create a new community
 Administrator should be asked to provide the following information:
  Name of the new community
  Partial URL for the new community
  Description of the new community (optional)
  Meta data for the new community (optional)
 Administrator supplies the data and continues to the next step.
 Administrator is asked to select from a list of available community templates.
 Administrator selects the template and continues to the next step.
 Administrator is taken to the newly created community.

The use case above covers a simple sequence for creating a new community. A more complex sequence can involve the selection of community members, modification of community resources, etc., as part of a wizard. Administrator manages an existing community Administrator Manages General Properties This use case covers the changes to the general properties of the community by the leader. These can include the following:

Community Leader elects to modify the properties for the community.
 System presents the current values and controls for modifying the following:

Display name (title)
Description
Time to Live (Begin/End date or time in hours, days, months, or years)
Meta Data
Community Leader modifies the properties and elects to save the changes.
System updates the properties with the new values.
Administrator Manages the Look and Feel
This use case covers the changes that the community leader can do when managing the look and feel for a community:
Administrator elects to modify the community.
Administrator elects to change the look and feel for the community.
System displays the settings and controls for changing the following:
Look and feel
Shell
Menu for the main book
Administrator modifies the values using the controls.
Administrator elects to save the changes.
System modifies the community using the changed values.
Administrator Manages the Site Structure
This use case covers the changes to the site structure by the community by the leader. The requirements can basically the same as those for a visitor modifying a desktop, including the following:
Administrator elects to manage the site structure.
System displays the current site structure, including editors for the following:
Pages within the main book
Portlets/books within the pages
Administrator may elect to do the following to the main book
Add pages, including
New blank pages
Existing pages from the library
Remove pages
Move pages (reorder)
Select the theme for the book
Administrator may elect to do the following for each of the pages:
Modify the display name for the page (title)
Modify the description for the page
Select the layout for the page
Select the theme for the page
Modify the page contents, including:
Adding/removing portlets
Adding/removing books
Changing the position of the pages/books on the page
Administrator elects to save the changes
System updates the community with the changed values.
Administrator Manages the Shared Pages
This use case covers the shared pages in a community that are accessible by all members, but editable only by the Community Leader(s). These pages can contain the various portlets that provide for collaboration between community members. The following tasks are those that the Administrator can be able to do when managing the shared pages:
Administrator elects to modify the community.
Administrator elects to create a new shared page.
System presents a list of available page templates, including a blank page.
Administrator selects the template or blank page.
System adds the new page to the community.
Administrator may elect to modify the newly added page.
Administrator elects to modify the community.
Administrator elects to modify a shared page.
System presents page editor with controls for the following:
Modify the display name for the page (title)
Modify the description for the page
Select the layout for the page
Select the theme for the page
Modify the page contents, including:
Adding/removing portlets
Adding/removing books
Changing the position of the pages/books on the page
Modify the page sharing, which is one of the following:
Shared with other users.
Not shared with other users.
Administrator elects to save the changes
System updates the community with the changed values
Administrator Manages the Personal Pages
This use case covers the personal pages that are optionally available to community members. The Administrator can allow the members to create their own personal pages, which are distinct from the shared pages. The following tasks are those that the Administrator be able to do when managing the personal pages:
Administrator elects to modify the community.
Administrator elects to modify the personal pages settings.
System presents list of users and their current permissions.
Administrator changes the permissions for each user to indicate whether or not they may have personal pages
Administrator elects to save changes.
System updates the entitlements accordingly.
Administrator Manages Applications
This use case covers the management of the included applications (portlets) in a community by the Administrator. In this use case the Administrator is not physically adding portlets to pages within the community, rather, they are making them available to the Community Members. This can be accomplished by setting entitlements for the portlets in a transparent manner. As with the Community Leader tools this is done via entitlements, but this might be made simpler than having to set entitlements for every portlet to make available to the community. The actions for this use case can include the following:
Administrator elects to select the portlets to make available to a community.
System displays the following:
List of available portlets by category
List of currently selected portlets
Administrator uses these lists and associated controls to do the following:
Add portlets from the available list to selected list
Remove portlets from the selected list
System sets entitlements accordingly
Administrator sets time-to-live for a community
Administrator manages membership
Administrator changes Community Owner
This use case covers changing the Community Owner to another user. In one embodiment, there is only one Community Owner, who is a special case of Community Leader.
Administrator elects to modify a community.
Administrator elects to change the Community Owner.
System presents current Community Owner and a list of available users and groups.

Administrator selects the new Community Owner.

System removes existing Community Owner and set the new one.

Administrator Adds/Removes Community Leaders

This use case covers the addition or removal of members in the Community Leader role, including the following actions:

Administrator elects to edit the community.

Administrator elects to add or remove other Community Leaders.

System updates the Administrator entitlements accordingly.

Administrator Adds Internal Users

This use case covers the addition of internal users, such as from LDAP, to an existing community. These users are already known to the system and are added to a group that is directly associated with the community. This group has access rights to the community, but these users may have different capabilities when using the portal.

The following tasks are those that the Administrator will do when adding internal users:

Administrator elects to edit the community.

Administrator elects to add users to the community.

Administrator specifies that the users to be added are internal.

System displays the following:

List of available users, groups, and roles from the internal system

List of currently selected users, groups, and roles

Administrator uses these lists and associated controls to do the following:

Add users, groups, or roles from the available list to the selected list

Removes users, groups or roles from the selected list

System updates the entitlements accordingly.

Administrator Adds External Users

This use case covers the addition of external users to a community, which can be quite different from the previous use case for internal users. While internal users are "known" to the system, making it possible to use standard user/group/security/entitlements, the external users are completely unknown. These users can be invited to join a community and if they elect to do so, will become known.

This use case can be similar to that for self registration in that the users can be required to sign in to gain access to the community. It differs in that only the invited users will be allowed to join, with the system checking that the user has the proper invitation. The invitation and validation mechanism should be similar to those used by existing internet sites with community-like functionality. The selection of users and sending of invitations should be as follows:

Administrator elects to edit the community.

Administrator elects to add users to the community.

Administrator specifies that the users to be added are external.

System displays a form for entering the email addresses of invitees.

Administrator enters email addresses.

System emails invitations.

The use cases for a Community Member joins an existing community are related to this use case and will cover the actions taken when the invitation has been received.

Administrator Enables Self-Registration

This use case covers the enabling/disabling of the self-registration functionality by the Administrator. Self-registration allows end users to become Community Members by registering themselves with no assistance or actions by the Administrator, Community Leader or other users.

In one embodiment, there are two variations on this, basically that of known versus unknown users, with the former being related to the previous use case for adding external users. These users will join the community, but they must have the proper credentials to do so. The unknown users are anyone who can access the site, effectively allowing an anonymous user to become a Community Member. In both cases the actions will be the same for the user, with only the underlying system being different. These actions include:

Administrator elects to edit the community.

Administrator elects to enable self registration.

System sets entitlements to allow for self registration.

Administrator Sets Permissions for Users

This use case covers the setting of permissions that apply to Community Members by the Community Leader. As with other parts of the system, these permissions can be via entitlements, but this can be entirely transparent to the Community Leader. The permissions can be provided as a fixed set in the default community, but may be extended by developers using the management framework.

Actual permissions to be set:

View, Create, Edit Communities

End user creation of communities

Invite external users by email address

Private views of communities for end users

Administrator Removes Users

This use case covers the removal of users in a community by the Administrator. There are two variations on this to cover the internal and external users. Internal users and external users who have joined the community are essentially the same in that in both cases a known user is available to be removed by setting the entitlements accordingly. External users who have not joined are different in that no user account yet exists for them, so instead they are removed from the list of invitees. The actions by the Administrator can include the following:

Administrator elects to edit the community.

Administrator elects to remove users to the community.

System displays a list of registered and invited users.

Administrator selects registered and/or invited users to remove.

System sets entitlements and/or removes invitees.

Administrator Archives a Community

Administrator Removes a Community

This use case covers the removal of a community by an Administrator, which makes it unavailable to members. In this case the community is physically removed, unlike the Community Leader case. The following actions can be done:

Administrator elects to edit the community.

Administrator elects to remove the community.

System makes the community unavailable to end users.

(System removes the community, including all community-specific resources.)

Administrator Creates a Template from an Existing Community

This use case covers the creation of a template for an existing community by the Administrator. These templates may be used by Community Creators to create new communities that provide a standard look and feel, initial set of applications, etc. For example, a company may require that all communities be created from a common template.

This template can be a template representation that is stored in the database. This is to prevent the creation of portal files by non-administrators/non-developers, and to allow for the support of templates when the app is deployed as a repository, such as an EAR. The steps that the Administrator uses to create a template are as follows:

Administrator elects to edit the community.

Administrator elects to create a template for the community.

System presents a form with the following fields:

Name of the template

Description of the template

Toggle to indicate if template is to be shared.

Administrator supplies information and accepts or cancels the creation.

System creates the template using the current community and supplied information. If the template is to be shared, the following additional steps can be done:

System presents a form with a list of all users with Community Creator status.

Administrator selects from the list to indicate who to share the template with.

System sets the entitlements to allow specified users to access the new template.

Developer Use Cases

These use cases are for the developer when building applications that are community-aware.

Community Context

The Community Context can contains information about the community that is relevant to applications, including information such as the following:

Identification (ID, name, description)

Membership (owner, leaders, members)

Lifecycle (time to live, max number of users)

Meta information (specific to the community)

Pseudocode

The following pseudocode is meant as an example only and should in no way be considered a design:

Java API

CommunityContext community=CommunityContext.getCommunityContext(request);

String name=community.getCommunityName( );

UserPrincipal owner=community.getCommunityOwner( );

List members=community.getRegisteredMembers( );

List online=community.getOnlineMembers( );

List props=community.getProperties( );

Controls

Figure 4:
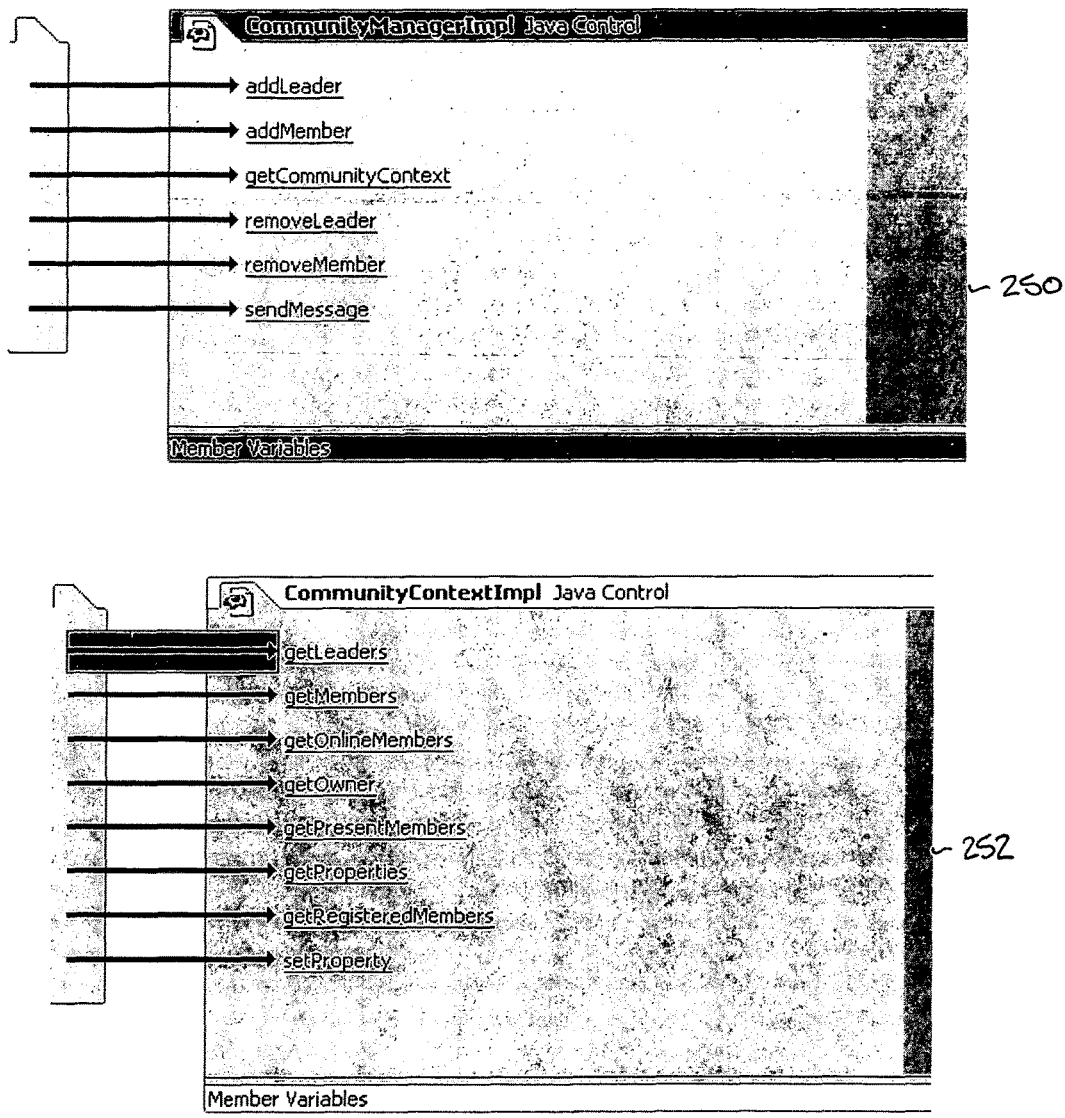
FIG. 4 illustrate examples of controls.

FIG. 4 illustrates examples of controls 250, 252.

JSP Tags

Portlets are the primary application component in a portal and therefore will be the most common place that the Community Context is used. A developer may use this context to make the portlets community-aware, allowing for different capabilities and behaviors if used within a community. For example, portlets that provide functionality for collaboration, scheduling, and notifications will benefit from having the community context available.

JSP

JSP-based portlets (including JPF-based portlets using JSP nodes) can use the Community Context via Java scriptlets and/or JSP tags.

Backing File

Portlets that use backing files can use the Community Context via Java APIs and/or controls.

JPF

JPF-based portlets will use controls and/or Java APIs to access the Community Context.

Developer Uses the Community Context in a Page or Book

The community context can be used with pages and books. Pages and books, in one embodiment, do not have a direct means of updating the screen or receiving input from the user, but they can work in conjunction with portlets via backing files. This can allow for more sophisticated applications in which multiple portlets on a page or across the pages of a book can work together.

Backing Files

Pages and books with backing files can have access to the Community Context via Java APIs and/or controls.

Developer Uses the Community Context in a Skeleton

The skeleton is not a traditional place for application logic, but the skeleton may make use of the Community Context to enhance the community user experience. For example, the titlebars for community-aware portlets can display different icons, messages, etc. based on whether or not other members are online. These icons may have links to allow the user to send messages or otherwise interact with other members.

JSP

Skeletons are JSP-based, therefore the developer can use the same Java APIs and/or JSP tags when accessing the Community Context.

Developer Uses the Community Context in a Shell

The shell is similar to the skeleton in that it is not meant to be a primary place for application logic, and instead is designed to provide navigation, identification, and other relevant information about the desktop. Like skeletons, the developer may provide enhanced functionality in a shell using the Community Context, for example displaying a "roster" of currently logged in members.

JSP

Shell JSPs such as for the header and footer may access the Community Context via Java APIs and/or JSP tags.

Developer Uses the Community Context in a Non-Portal Object

There are cases when access to the Community Context from a non-portal object may be desirable. For example, a workflow may take actions that affect the community, but which may not be the direct result of a HTTP request. Similarly, an external application may which to interoperate with the community, but being out of request and out of process requires that the Community Context be remotely accessible.

JPD

JPDS may access the Community Context via controls and/or Java APIs.

Java Classes

Java classes may access the Community Context via Java APIs.

Web Services

Web services may access the Community Context via WSDL and the associated controls.

Community Application Use Cases—Events and Notifications

This use case is intended to provide an example of a Community Application working in a Community: Community Leader adds a Content Directory Portlet to the Community. The Portlet generates events on changes in the Content of the portlet. The Content Directory Portlet can either notify all active community members on a change, or allow users to subscribe to changes in particular folders.

Notify All Example:

The Community Leader adds new content to Folder X.

The Content Directory Portlet generates an event correlated to that change.

The Content Directory Portlet calls a get of all active Community Members.

The Content Directory App sends an email to all members.

Notify Some Example

The Community Leader adds new content to Folder X.

The Content Directory Portlet generates an event.

The Content Directory App checks users subscribed to that Folder.

The Content Directory App gets emails for those users and sends email to the list.

Workspaces are just a personal view of a community. A work space or shared space is an end user configured view of the desk top that they have complete control to make available to other users.

1. End users can have the ability to create a shared space
2. Users can define the shared space as public or private
3. Shared spaces can be archived
4. Shared spaces may be deleted
5. End users will be able to configure the users, groups and roles of people that may use the space
6. Shared space will support user invitation by email address
7. Spaces can support user registration
8. Administrators should have a selection available to make workspace creation and the workspace attributes (public, private, etc) available to specific roles on a per desktop basis
9. Leverage Delegated Administration once roles are defined—allow space "owner/administration" can delegate to other users.
10. Support inheritance of security roles when creating or adding users to a space
   a. Roles in portal can be more fine grain at the resource level
   b. Allow creation and mapping of user types to spaces.

Figure 5:
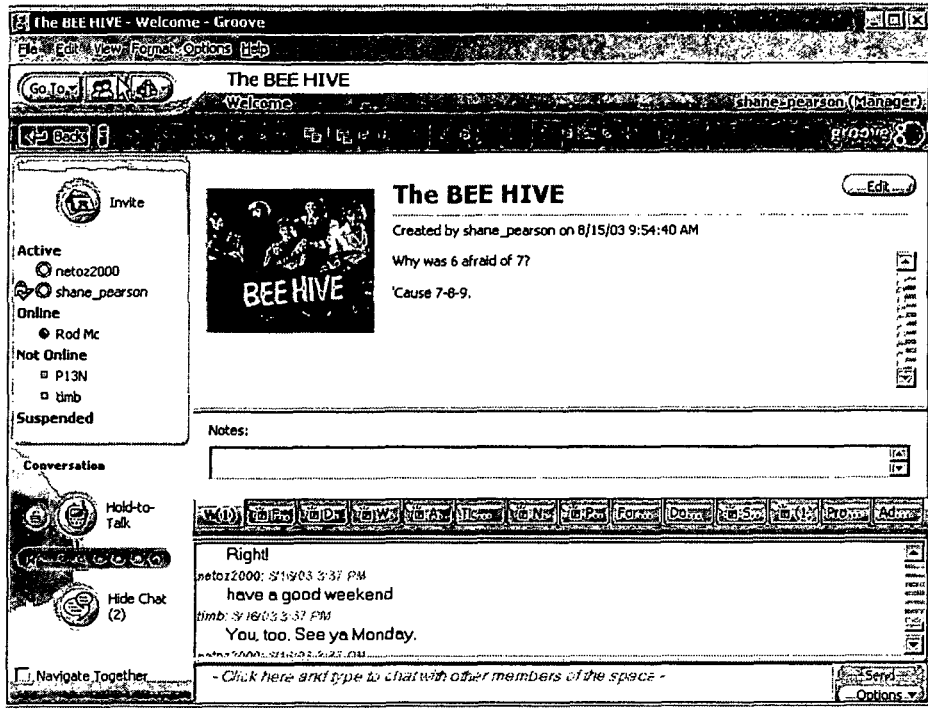
FIG. 5 illustrates an example workspace.

FIG. 5 illustrates an example workspace 260.

A community template can be the pre-packaged set of resources from which a community can be built. It is similar to a .portal file in that a community creator would choose to create a community from the community template in a similar fashion to how a user would create a desktop. This template can include a set of community applications and templates, a set of configurations and other resources that will allow a customer to create a fully functional Community.

Community Template Definition

A Community template can be a "drop-to-install" package, similar to a webapp-library module that contains all of the required resources to generate a running community of a particular type from a particular community provider. It can contain the following types of assets:

Setup Wizard: depending on the base setup capabilities provided by the WLP Communities feature, this can consist of a set up JSP files, XML-based configuration/driver, classes, DDL etc. which are required to execute in order to generate an instance of the community. The particular wizard can be up to the community template developer to create and performs whatever actions, including user prompts, to instantiate an instance of the community. The wizard can be addressable from a unique URL and walks the community creator through the community creation process. The wizard should require authorization prior to execution. The user who creates the community instance via the Setup Wizard can be made the Community Owner.

The wizard can deploy the following assets into the portal webapp as long as they do not already exist (i.e. from a previous execution of the community template wizard).

Framework files such as Look and Feel (skins and skeletons), menus, etc. which are used by the community.

Portlets that make up the applications available in the community. Community portlets should have some metadata associated with them that associate the portlet to the community. The portlets can include the .portlet files as well as any JPF, JSP, class files, etc. that make up the portlet applications.

Optionally, a community template might consist of a .portal file. This is optional since the community wizard could dynamically create a streamed desktop for the community directly without the need for a .portal file. Since communities are assumed to require the features of a streamed desktop such as end-user customization such as preferences, if a template included a .portal file, it is assumed that one of the final steps in the setup wizard would be to generate a streamed desktop from the portal file.

Community Services

There are several features for portal Communities that can be available to community template and application authors.

Notification Service: This is a central and commonly used feature of communities. Any community application (portlet) should be able to register itself with the notification service in order to communicate to registered community members changes that occur within the application. For example, an issues log portlet in a Project Management community, should allow for community members to "register" their interest in changes to any specific issues or all issues. When issues are updated or added the appropriate community members (appropriate meaning that the user has registered interest for notification) should be notified of the change.

Presence: Presence is another useful and common feature which communities might make use of. Again, this is up to the community application (portlet) developer to make use of. Using a central presence service, portlet developers can incorporate presence awareness and related functionality in their portlet design. Presence information should include the ability to determine presence in a particular community as well as general portal application presence.

Calendar: Many all communities can make use of a Community Calendar. Therefore, portal should provide some useful calendar functionality out of the box. The usage and use interface of the calendar would be specific to the community, however, general APIs should exist to create, retrieve and manage dated/timed events.

The Portal System Default Community Template

The system can include a default community template which can create an instance of the portal Community. The WLP Community is designed to be a very useful community portal site for performing routine project management and team organization functions. It will include a setup wizard and various portlet applications designed to allow community members to interact around a common theme, project management. Customers, partners and Internet Service Vendors (ISVs) can customize and/or us be this template as the basis for additional templates.

Setup Wizard

The default community can contain a setup wizard that can prompt the community creator for various configuration details and subsequently generate the community instance. The wizard can gather the following items:

Name of the Community

Description of the Community

List of Community Administrators

List of Community Members

Default Content Repository for Community Library storage

Other configuration details required by the individual portlets

The following items can be derived from the included configuration/driver XML file:

Data source(s) to use (note that we should not allow community templates to define data sources.)

Default content repository to use for Document Library

Etc.

Framework Files

The default community can include a set of look and feels (skins and skeletons) and other assets such as menus to achieve a very attractive and functional community. Personalization of the look and feel can be easy using placeholders and case adding stylistics or some other mechanism to allow Users to replace an Image and Text.

Portlets

At the heart of the Community are the portlets that make up the community. As stated previously, these portlets can be geared around the concept of a project/team management paradigm.

Each of these portlets can provide the appropriate hooks into the Notification Service in order to allow for members to register interest and receive notifications on change.

A Content Management system can be used for storage of all of the data created by the portlets. This will make it much easier for customers to create community instances without having to have database administrators create tables in databases.

Detailed below are portlets desired for a community portal.

Content Directory Portlet

Content Management Portlet can provide end users the ability to browse the content directory where they have access privileges and create and manage types and content items as they have privileges.

Document Library

Provide the ability for administrators and end users to create a document library. These are used to manage a collection of documents or other files that you want to share in a desktop or community context.

Document libraries support base content features such as sub-folders, file versioning, and check-in/check-out, but are scoped to the community they are added Entitlements be used to manage who can see this library or to understand "special" or "magic" directories. These can be capable of being scoped to the community—in essence private to the community and would not be generally accessible via search or browsing outside of the community. The role/policy could be changed to make it available outside of the community.

It can be possible to access community services from multiple places. For example, a user should be able to schedule a meeting about a given doc from within the doc library.

Links

Application that allows users to create links to URLs.

Links can shared or private to the user who created them. Alternately, there can be two types of Link portlets, "My Links" and "Group Links".

Announcements

Application used to provide quick news items to portal users

Simple version would provide edit based on secure role

Portlet should also be able to support context management authorization process if required The Properties of an Announcements can be the following.

Title

Abstract

Body (Binary)

RetireOn (Date)

There can be a single Announcement portlet that draws from a single set of Content Items or Announcements can be "scoped" to an instance of the Announcement portlet (ie. By using a portlet preference to say "Corp" or "Partner" and to only show "Corp" announcements in the instance that has the Pref set to "Corp")? This can use a Content Query. The context querry can be capable of being scoped to the DB or to a particular community.

Contacts

Provides users the ability to store contact information

In one example, three versions are used.

Database version runs in the portal

MSFT Exchange version

Lotus version

Events

Figure 6:
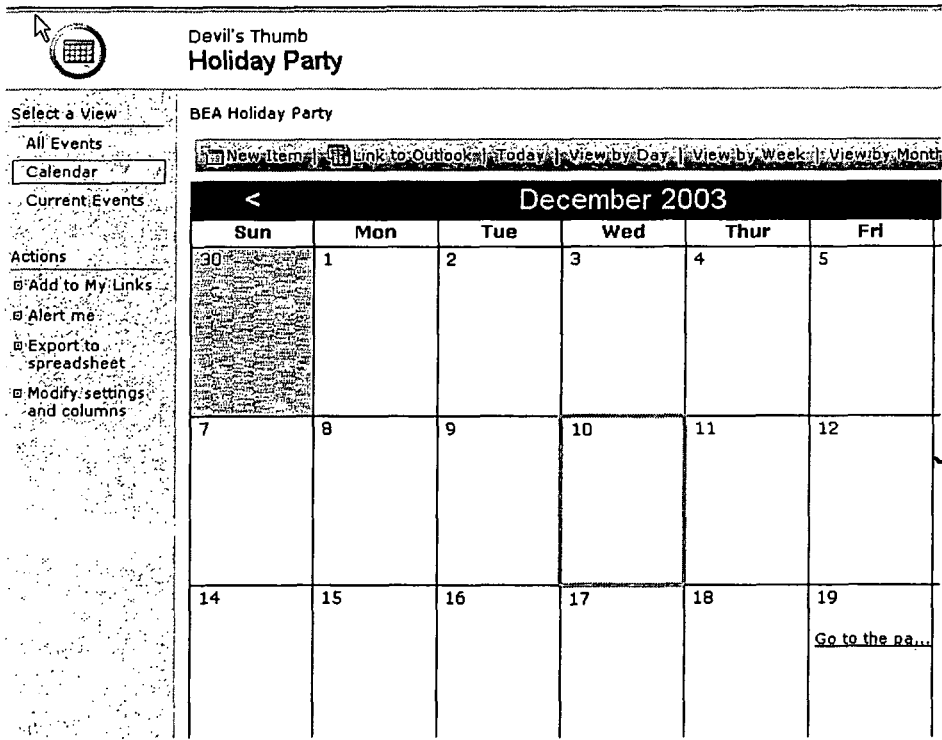
FIG. 6 illustrates an exemplary calendar.

Provides users the ability to create event nonfictions. Similar to announcements Integrated to default database calendar 270 such as that shown in FIG. 6.

Tasks

Provides users the ability to store tasks

Supports personal and group based tasks

In one embodiment, three versions can be used

Database version runs in the portal

MSFT Exchange version

Lotus version

This is PIM.

Discussion Forums

Provides users the ability to participate in discussions

Forums can be added and scoped to desktops and portals

Database version can run in the portal

Can support threaded and flat view

Can support moderation

Newsgroups

Provide a portlet application to host standard newsgroup communication

Survey

Provides users the ability to create and manage surveys.

Polls can be scoped to specific desktops and communities

Database version can run in the portal

Results can be stored to database for reporting purpose

Allows configuration to display results to end users

Polls

Provides users the ability to create and manage polls.

Polls can be scoped to specific desktops and communities

Database version can run in the portal

Results can be stored to database for reporting purpose

Allows configuration to display results to end users

Calendar

Figure 7:
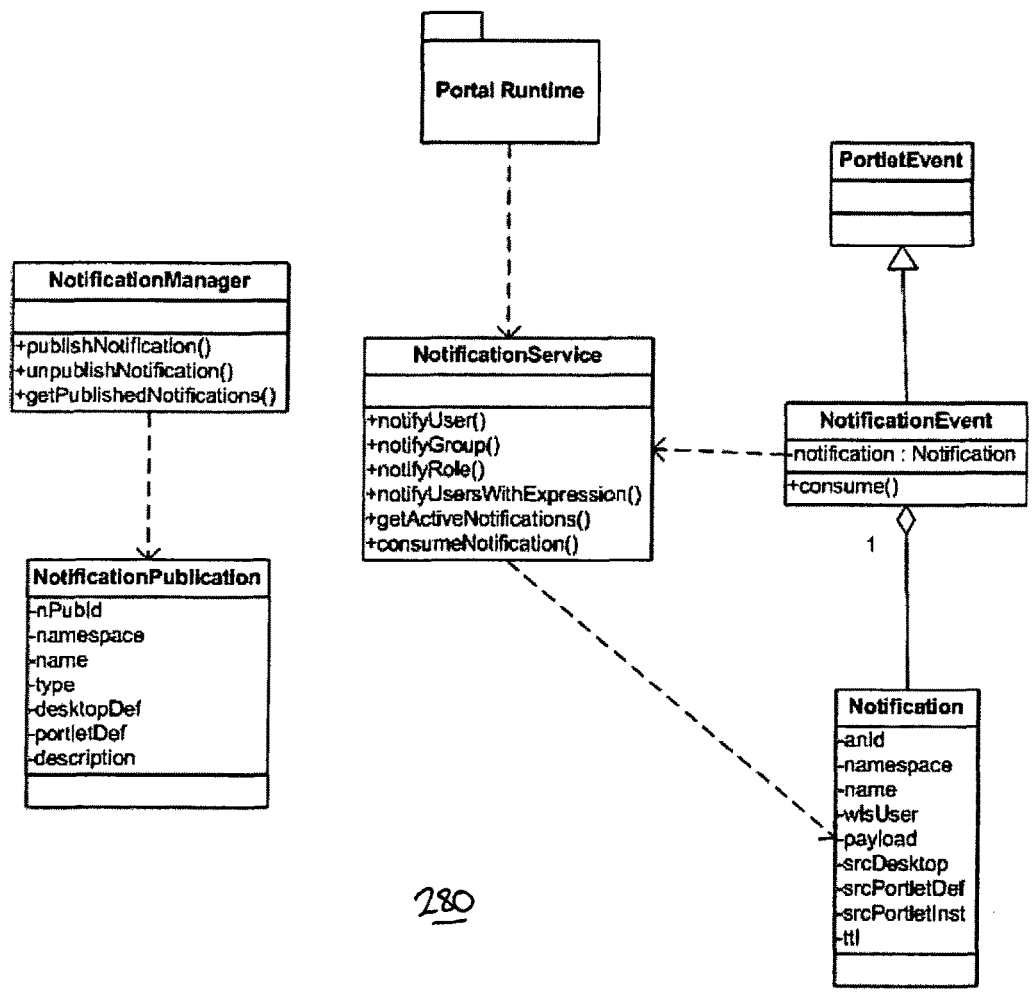
FIG. 7 illustrates a class diagram for portal notifications.

Provides users calendar capability. Supports personal and group based tasks. In one embodiment, three versions can be used Database version runs in the portal MSFT Exchange version Lotus version Email Provides users the ability to use email. In one embodiment, three versions can be used POP, IMAP
  MSFT Exchange version
  Lotus version
Search
  Expose enterprise search features to end users
  Allow advanced search options for display and management of search
    Can allow users to save Queries for repeated execution
    Can save most recent searches for re-execution
CM Search
  The Template can include a Portlet that ties together the Portal Taxonomy and the Content Taxonomy.
Person/Expert Location
  Provides a capability for person to search the available portal users
    Can restrict search by security privileges
    Provide user information
    Can support opt-out by individual users so they can choose information to share
    Can support multiple device information
    Can support presence and status for users
RSS Portlet
  Can connects to external sites that provide RSS (Rich Site Summary) information, retrieves news topics based on visitor preference, and displays them as clickable links. Can provide news feeds for the user.
SAP iView Portlet Builder
  Provides a proxy portlet to display iViews in a Portlet
Desktop and Community Templates
  Several predefined templates can be used by administrators and end users to define desktops and communities. Examples can include: Blank, Team and Project Desktop, Document Sharing Community/Workspace, News Sharing Community/Workspace and Meeting Community/Workspace.
  Notifications for the Portal Framework are a mechanism for publishing availability, subscribing to and delivering notification events within a portal. A notification event can be a sibling to other types of portlet events as defined in the current inter-portlet eventing design, in that portlets can be authored in a declarative manner to listen for notifications using an event subscription tag within the portlet or portlet instance tag. The primary difference between notification events and normal portlet events is that the source of the notification comes from outside of the user's portal desktop. Instead, notifications may come from other users, web applications, or even the framework itself. When notifications are sent, the Portal Framework manages a store of active notifications that are persisted until explicity consumed by a target portlet.
  Notifications can be used for the use cases described in the Communities Templates and the overall Communities feature specs.
Programming Model
  The class diagram 280 of FIG. 7 outlines the basic underpinnings of Portal Notifications.
Developing Portlets to Consume Notifications
  End user development of portlets using notifications can be very similar to portlet development for portlet events. To enable a subscription to a notification event, a portlet developer or assembler includes a notifications event tag within the event tag portion of the portlet or portlet instance:

<handleNotificationEvent namespace="WLP"
name="communityInvitation>

```
  <firePageFlowAction action="notifyOfInvite" eventLabel="x"/>
</handleNotificationEvent>
<handleNotificationEvent namespace="hr" name="holidayChange"
  desktopDefinition="hr_1" portletDefinition="holidayManager_1"
  portletInstance="tempEmployeeHolidayManager">
  <firePageFlowAction action="showNewHolidays" eventLabel="y"/>
</handleNotificationEvent>
```

Each published notification can result in a single active notification per user associated with the publishing event, as described later. All notification subscriptions can identify at least the namespace and name of the notification they are interested in. Namespacing provides an easy mechanism to allow third party developers to develop portlets that publish and consume notifications without name clashes. Notification subscriptions can optionally also filter notifications based on the source desktop and the source portlet definition and instance ID, for cases where a subscriber portlet is only interested in notifications from a specific set or single portlet. By default, if these additional filters are not specified, a subscriber will be notified of all notifications with the associated namespace and name.

Notification-events can be thought of as another form of inter-portlet event that happens to come from the portal framework itself rather than being raised by another portlet. When the framework runs the lifecycle for a desktop tree, any available notifications events delivered to a subscribed portlet during the handleEvents portion of the handlePostback lifecycle stage. Upon receiving a notification event, a portlet can be configured to use a backing file or call to a PageFlow action to deal with the event. A NotificationContext object can be made available to any portlet receiving a notification event. This context object can contain a reference to the current notification, which can contain all available information about the notification, including namespace, name, source portal definition, source portlet definition and source portlet instance (if sent from a portlet), description and a String payload.

Notification Producers

Both the Portal Framework and third party portlets can produce notification events. In order to facilitate the discovery and configuration of subscribers to these notifications, a persistent set of current notification publications can be stored and made available to admin and development tools via the NotificationManagerAPI. Portal Framework publications can either come from a set of known "standard" notifications or can be provided via a notifications-publications.xml file. Portlets can be authored to contain a notification-event publication that is disassembled with the portlet and added to the persistent set of publications:

```
<notificationPublication  namespace="WLP"
name="communityInvitation" description="Notifies that a
user has been invited to a Community"/>
```

Sending Notifications

Producers of notifications can use the NotificationService to send, access and consume active notifications. Notifications can be sent to individual WLS users, a group of users, or users matching an input expression. Notifications can be scoped to be sent either within the current web application, or globally.

For each notified user, a persistent Notification is created that contains the namespace, name, scope, payload and time-to-live specified by the producer. The NotificationService additionally can collect the source desktop definition, portlet definition and portlet instance ID if applicable to store as part of the notification.

For portal desktops that are enabled for notification delivery, a query against the active notifications for a user can be performed prior to executing the portal lifecycle for each request. This collection of active notifications can be filtered against the notification handlers defined within portlets and portlet instances for that desktop, a NotificationContext can be populated into the request containing a reference to the NotificationEvent, and the associated handling action can be invoked for the portlet.

Notification can remain active until explicitly consumed by a handling portlet, using the consume( ) method provided by the NotificationService, or until the time-to-live specified in the notification expires. This means that more than one portlet can respond to a notification without actually removing it if that is the desired behavior. In one embodiment, until the notification is explicitly consumed, any subscribed notification event handlers will be invoked for each request.

Notification Persistence Design

In one embodiment, because a notification can be sent to groups of users and each user must individually acknowledge (remove) the notification, the notification table must contain an entry for each user for each notification. Because the "payload" and other characteristics of a single notification batch are identical for each user, this information can be separated and stored only once per notification so as to minimize redundancy in the database.

Notification Delivery Design

To facilitate notification delivery in a timely manner without incurring a database query on each request, a local cache of notifications can be maintained on each node in the cluster. When a request is being processed, the NotificationService can be queried to determine if any notifications are waiting for the user. If the local (to the cluster node) cache does not have an entry for the user, the database is queried and the cache is loaded with all active notifications for the user. Subsequent requests should be able to consume from the cache without suffering from a database hit.

When a notification is sent using one of the NotificationService methods, it is placed into an internal queue and the method returns immediately. The queue is serviced by a separate threadpool maintained by the NotificationService, so as to make notification processing asynchronous. This is necessary as a notification can be sent to hundreds or thousands of users by addressing it to a group (potentially even "everyone") and may take a considerable amount of time to process.

Once a thread in the threadpool has pulled the notification-sending request from the queue, it starts by storing the notification payload in the database table. It continues by persisting the individual notification records for each of the affected users in batches. Once the database persistence work is done, it publishes information about the notification (payload and a list of affected user names) to a JMS queue, batching the information if the user list is too long.

The local caches on each of the nodes in the cluster listen to this JMS queue and update their caches accordingly if they are currently tracking information for any of the affected users. In this way, the caches only need to pull information from the database to bootstrap support for a newly-tracked user and do not need to incur a database read penalty to keep up-to-date on newly sent notifications.

Notification Timeout and Consumption

Each notification can be marked with a "self-destruct" flag when it is sent from the NoticiationService API. This flag can indicate whether the notification framework should automatically clean up database information about the notification after it has been consumed or timed out, or whether this information should be stored for possible later use in queries.

When a notification is first sent, its status is set to "active" for each user.

When a portlet consumes a notification, the notification is still delivered to other portlets for the remainder of that request processing only. Once request processing is complete, the NotificationService tracks all notifications which have been consumed during the processing and removes them from the local cache. Further action can depend on a self-destruct flag:

For notifications marked to self-destruct, the PF_NOTIFICATION table entry for the user for that notification can be simply removed.

For notification marked not to self-destruct, the PF_NOTIFICATION table entry for the user for the notification can be updated to "consumed" status.

When a notification cache is loading information from the database for a user, it can examine each notification to see if it has run past its predetermined time to live. If a notification has timed out, it is not held in the local cache, but further action is taken to update the database:

For notifications marked to self-destruct, the PF_NOTIFICATION table entry for all users for that notification is simply removed.

For notification marked not to self-destruct, the PF_NOTIFICATION table entry for all users for the notification can be updated to "timed-out" status where the status was previously "active". Notification entries with a status of "consumed" are unaffected, allowing future querying to determine which users consumed the notification.

Community Management

The ICommunityManager is the primary interface for communities' persistence and management.

CommunityDefinition

The CommunityDefinition object can represent all data associated with a community. It can have getter and setter methods for various attributes of a community like CommunityId—getter always returns null (no setter provided)

LocalizationResource

DesktopDefinitionId

DesktopInstanceId

Time to live

TimeZone

Is community active

Is community public

Is community a template

Are personal pages enabled

Is self registration enabled

Self registration page uri if self registration is enabled

Deactivated uri—uri to be displayed when community is inactive

Properties associated with community

Another object, CommunityDefinitionInternal, can represent a persisted community. In one embodiment, the sole difference between CommunityDefinition and CommunityDefinitionInternal is that the latter has a CommunityId set. CommunityDefinition has public access and is used as a vehicle to pass into and receive community data from the ICommunityManager. CommunityDefinitionInternal, as the name suggests, can have restricted access and can be only ever referred to or created by entities internal to the portal framework.

CommunityId

Represents a unique identifier assigned to each community. Community ID can be used as an argument to certain methods on the ICommunityManager.

PortalEntitlementResource

The PortalEntitlementResource can encapsulate information to provide access control on various capabilities like VIEW, UPDATE, DELETE and CREATE on a community.

CommunityEntitlementHelper

The CommunityEntitlementHelper provides static convenience methods to check access privileges to various capabilities on communities.

CommunityInfo

CommunityInfo is a structure to hold information to be passed on to the CommunityDefinition constructors. Its purpose is to avoid the confusion caused by a constructor with several arguments of the same type.

Accessing a Community

On a request for a desktop the portal framework can check if the desktop is a community. If not, the flow proceeds similar to what is in existence now for accessing desktops. If however, the desktop is a community, the portal framework can go through the following steps to display the community:

Check if the current user is a member (either creator, leader, manager, member) and among other things populate the CommunityContext with this information Check if there is a customized desktop for the current user and if so display the customized version If a customized version is not present display the shared community version Entitlements applied to components (books, pages and portlets) of the community desktop at the definition level may result in some or all of the components not being visible to the user.

New Community Creation and Cloning

The creation of a community from a desktop can involve a deep copy of the control tree and preferences associated with the desktop. A new desktop definition, marked as a community desktop, can be created. All customized instances i.e. instances of type user, can be used to create new instances of type admin to be used with the new desktop. So, if the desktop under consideration is an admin desktop a new desktop definition and primary instance pair can be created with the primary instance pointing to the same primary book that the reference desktop was pointing to. If the desktop instance is of type 'user' all the users customizations and preferences can be copied and turned into 'admin' instances. In one embodiment, a new producer side portlet instance can get created.

The same logic will apply to cloning a community.

Display of Community Desktops in Admin Tools

Implementations of existing APIs that return a list of desktops can be changed to ignore desktops that are marked as communities. This involves adding a column (IS_COMMUNITY) to the tables PF_DESKTOP_DEFINITION and PF_DESKTOP_INSTANCE.

Entitlements

The PortalEntitlementResource can be used to create entitlement resource ids for communities. A helper class CommunityEntitlementHelper will be used to check entitlements at runtime. Entitlements can be applied using expressions that use information in the CommunityContext to determine whether the current user has the privilege to access a given capability on the community specified in the CommunityContext.

Error Page

Error page URIs for when a community does not exist or is unavailable is considered a general feature applicable to the portal framework and as such will leverage the implementation thereof.

APIs for community properties and paginated search on these properties can follow a general guideline for metadata and paginated search. The metadata API will also be used to flag resources as community enabled.

Figure 8:
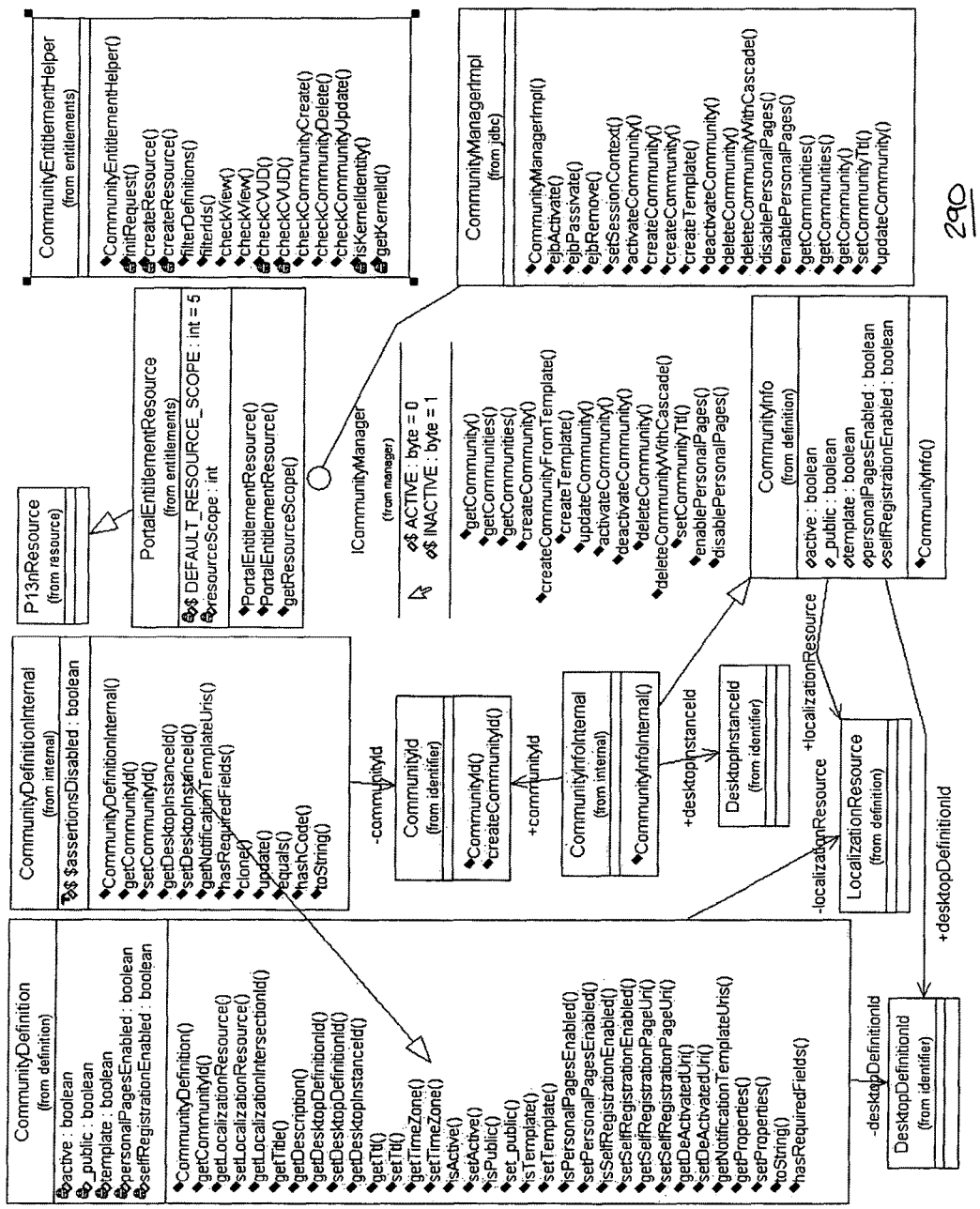
FIG. 8 illustrates an exemplary data model for communities.

FIG. 8 illustrates an exemplary data model 290 for communities.

Portal Framework Template Management

This involves managing templates for various resources. Template management can include managing template types—Desktop, PortalFile and Community.

IPFTemplateManager

The PFTemplateManager can be the primary interface to template management.

TemplateDefinition

TemplateDefinition can represent data associated with a template. It can have getters and setters for the following fields:
   templateId
   templateTypeId
   localizationResource
   templateResourceId TemplateTypeDefinition A TemplateTypeDefinition can represent data associated with a template type. Template types define a general class of templates for e.g. Desktop templates. This class can have getters and setters for the following fields:
   templateTypeId
   templateType TemplateId A TemplateId can be a unique identifier to a template and can be part of the TemplateDefinition.

TemplateTypeId

A TemplateTypeId can be a unique identifier to a template type and can be part of the TemplateTypeDefinition.

TemplateResourceId

The TemplateResouceId class can be a structure meant to encapsulate the fact that a template resource identifier may be an Id (e.g. DesktopInstanceId, CommunityId) or an URI (e.g. URI to a portal file).

TemplateEntitlementHelper

Figure 9:
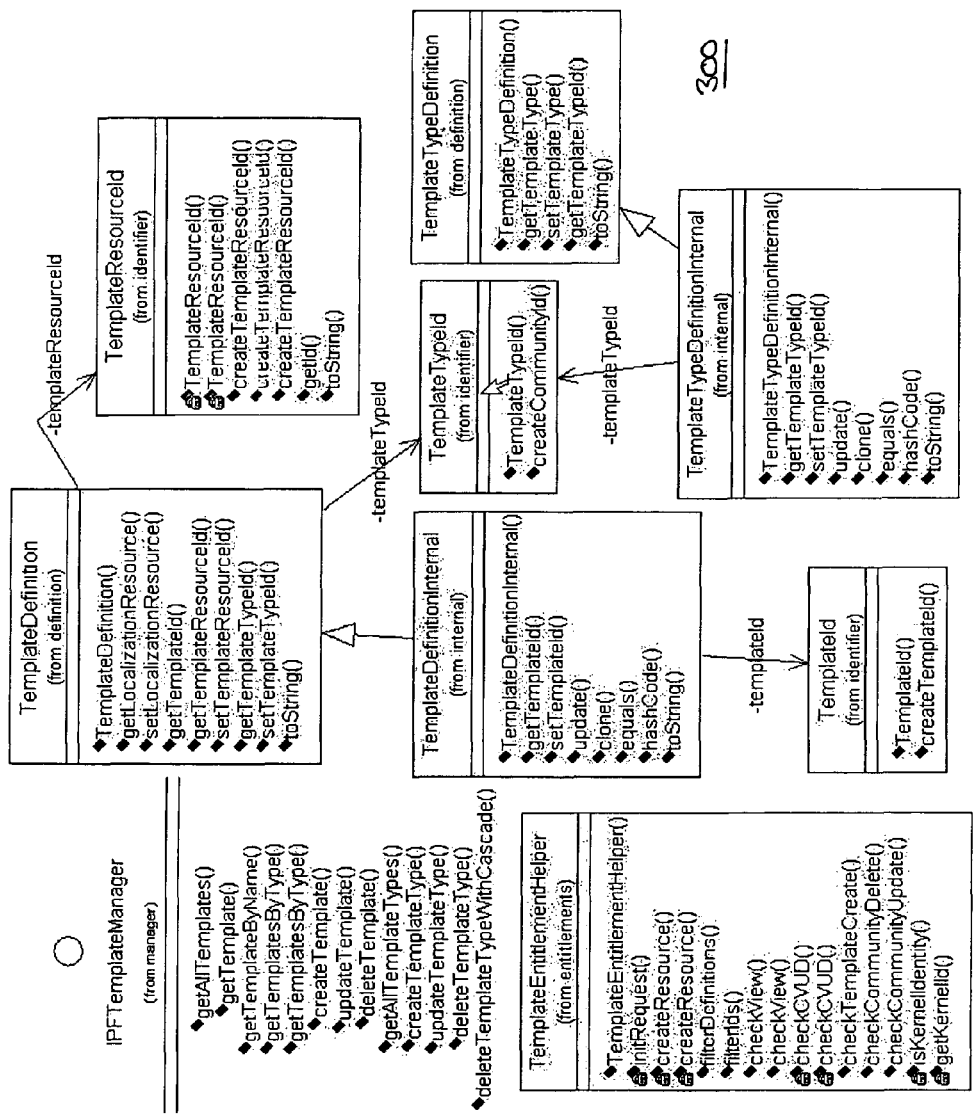
FIG. 9 illustrates a data model for templates.

The TemplateEntitlementHelper can have functionally similar to the CommunityEntitlementHelper class as regards templates. FIG. 9 illustrates a data model 300 for templates.

Community Creator Tasks

The Community Creator is a special role for Community Leaders who have the ability to create new communities.

Community Creator Creates a New Community

Figures 10, 11, 12:
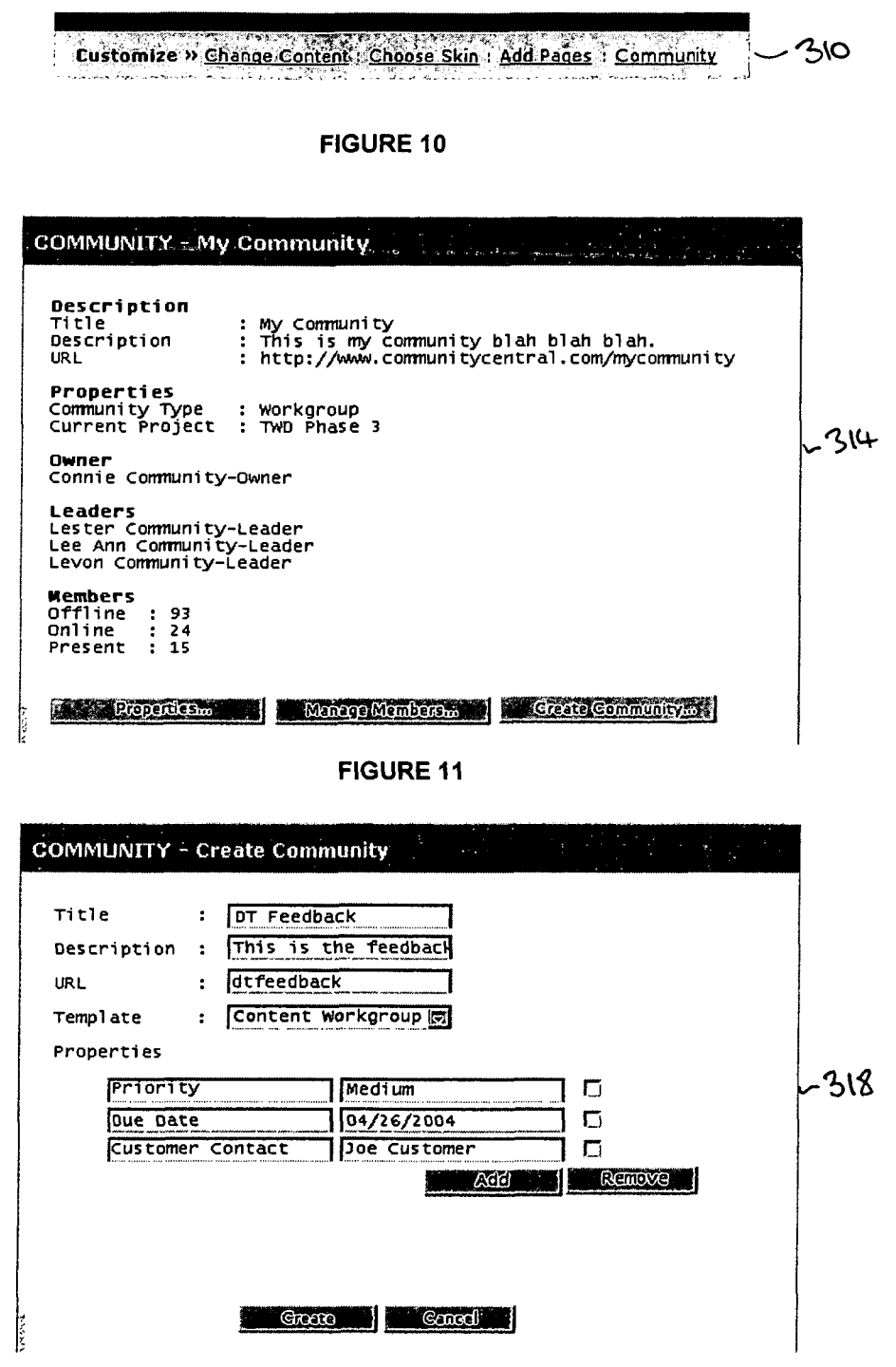

FIG. 10 shows links 310 to Visitor Tools that can appear on each desktop page. The Community link is only available if the desktop is a community. Step 1: From the desktop, the user chooses the 'Community' link to get the community section of the Visitor Tools.

FIG. 11 shows a Community editor 314 in Visitor Tools. Buttons are enabled based on user entitlements, with the "Create Community" button only available to those in the Community Creator role. Step 2: From the community editor in the Visitor Tools, the user chooses the 'Create Community . . . ' button.

FIG. 12 illustrates a Create community form 318 in Visitor Tools. Fields are provided for specifying the standard and custom properties for the community to create and buttons for creating the community. Step 3: From the create community editor, the user enters the requested information for the new community and press the 'Create' button.

Figures 13, 14:
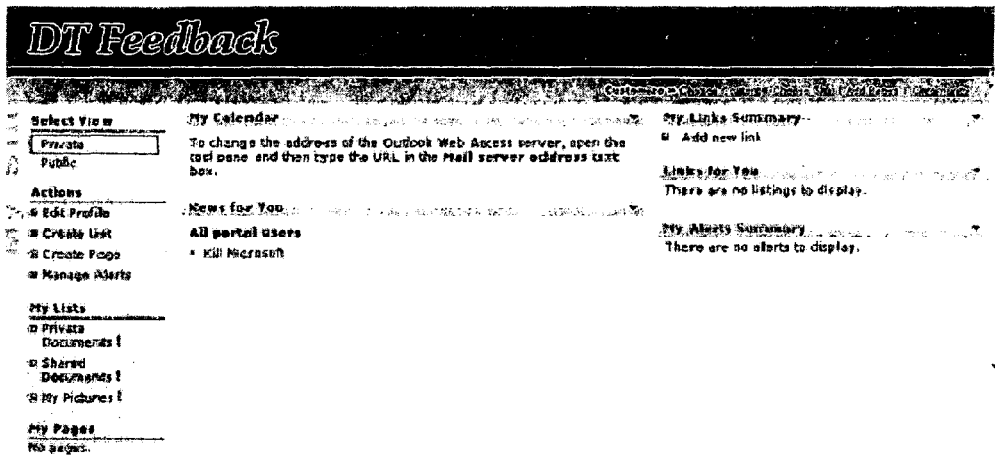
FIG. 13 illustrates a newly created community which the creator is directed to upon creation.
FIG. 14 illustrates a page that allows a Community Leader to browse for User.

FIG. 13 illustrates a newly created community 320 which the creator is directed to upon creation. Step 4: In the newly created community, the Community Creator is now the Community Leader and may proceed with those tasks.
Community Leader Tasks
Community Leader manages Community Managers
Community Leader adds or removes Community Managers
Community Leader removes Community Managers
Community Leader manages community lifecycle
Community Leader deactivates a community
Community Leader reactivates a community
Community Leader sets the time-to-live for a community
Community Leader deletes a community
Community Leader creates a template from the community
Community Manager Tasks
Community Manager manages an existing community
Community Manager manages general properties
Community Manager manages look and feel
Community Manager manages site structure
Community Manager manages the shared pages
Community Manager enables personal pages
Community Manager manages membership
Community Manager adds internal users Community Leader can searches for Users to which they have access and selects the Users to add as Members. This can function in a very similar fashion as Role Creation:

Also, the Community Leader could browse for User to which they have access through the Group Hierarchy 330 as shown in FIG. 14.

Community Manager adds external users

1. Community Leader Selects Invite Users.

2. Community Leader enters the email names for the Invitees.

3. Is the email their User Name?

a. If yes—the User is added to the configured Authentication Store as foo@bar.

b. If not, the User can be stored as foo in the Authentication store.

4. are they assigned a password? If Yes, then the Community Leader should be able to set the default password.

Community Manager Sets Permissions for Users

1. Community Leader selects Community Managers and add Users from Community Roster.

2. Community Leader selects Portlet in the community. The portlet is community enabled. The Community Leader selects the Edit/Configure Mode. The Portlet lists capability sets and appropriate capabilities. See example below for a discussion thread portlet:

Community Manager enables self registration

1. Community Leader marks Community as Public.

2. Community Leader marks "Enable Self Registration"

3. Community Leader adds Registration Portlet or Link to Community Home Page. It would be best if this were "Automagic"—a property of the template.

Community Manager removes users

1. Community Leader selects User.

a. Community Leader Disables Account b. Or—Community Leader deletes User from Membership Roster.

Community Member Tasks
Community Member Searches and Discovers Communities
Community Member Receives an Invitation to Join a Community The use cases in this section cover the way that a Community Member is invited to join a community and how they react. An important consideration is to provide both the default functionality that will be most commonly used, while preserving the ability to modify or extend this functionality as desired.

Community Member Receives an Alert Inviting them to Join a Community

In this use case the Community Member is currently present in another community, desktop, or other application that is within the scope of the presence features for a portal product. No assumptions are made except that the user is known to be present and that there is some way of notifying them in an online manner. The most likely scenarios are covered here, but these should be considered as the default supported scenario and not the only ones possible.

There are two factors to consider for this type of invitation, including the type of user interface (UI) and the preferences of the Community Member. A community may provide an enhanced UI which utilizes RichUI and hooks for instant messaging (IM), the more basic HTML-only case also be supported. These three variations should handle the most common cases for users that are known to be present, while leaving the door open for others as technologies emerge and customer desires change.

In all of these cases the framework should provide a standard mechanism for handling events as well as polling to determine how to handle the invitation requests. The former is useful for notification by the "active" UI's provided by RichUI and IM, while the latter is better suited for the request-response architecture imposed by standard HTML. While not directly covered in this section, this notification framework should be considered for general-purpose use in community-based applications.

Some things to consider include:

Fallback notification. If a Community Member has been invited to join a new community but is not present in a known community, portal, etc., there is no way for the alert-based notifications to work. There can be a fallback to email-based notification after a certain time period to ensure that the Community Member is aware of the invitation. This can be configurable, either by a Portal Administrator or a Community Manager/Leader.

Non-active notification UI. A Community Member may have chosen to use HTML-based notification in a portlet or other UI element that is not currently visible. If the portlet is on a page that is not accessed, it may not have the opportunity to be rendered to show the notification. This might be handled using the same fallback mechanism described above, or perhaps by something lower level in the rendering cycle that guarantees notifications are displayed.

HTML Notification

Figure 15A:
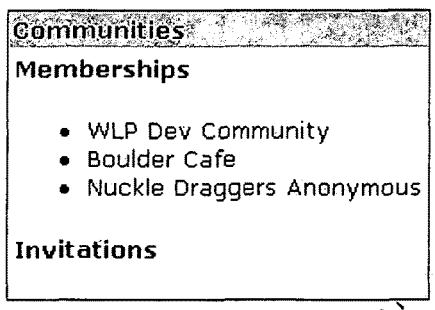
FIGS. 15A-B illustrate exemplary community notifications.

In this scenario the community either does not support RichUI or IM, or the user has elected to receive notifications via a portlet or other HTML-based component. These components should be able to check for invitations to join a community and then display the link. The Community Member can use the following steps when being notified of invitations to join a community:

Step 1: The Community Member is logged in and has added a portlet that displays all communities that he is a member of and has been invited to join, as shown 340 in FIG. 15A.

Figure 15B:
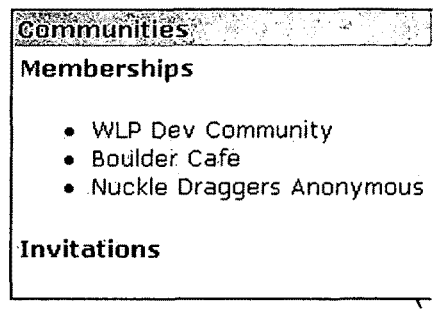

Step 2: A Community Manager has added the Community Member to a community, triggering the invitation notification. The Community Member reloads or otherwise refreshes the browser, causing the display to change as shown 342 in FIG. 15B.

Step 3: The Community Member elects to join the community by clicking on the link displayed. This scenario is continued in the Community Member joins an existing community section.

RichUI Notification

Figure 16A:
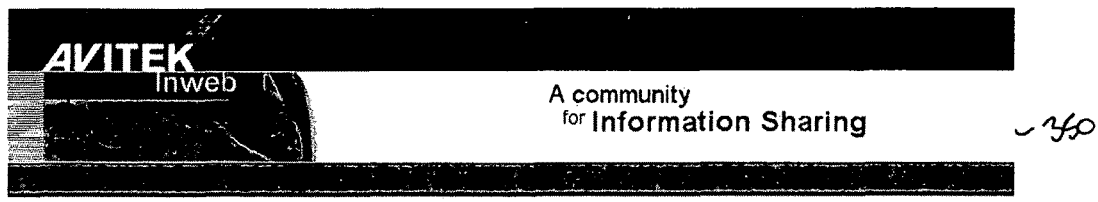
FIGS. 16A-B illustrate exemplary headers.

In this scenario the community provides RichUI components that allow for a more dynamic display without the need for browser refreshes. The community includes a header that uses RichUI components to alert the user of interesting events, such as being invited to join a community. The Community Member can use the following steps when being invited to join a community:

Step 1: The Community Member is logged into a community or other site that has a RichUI-enabled header, as shown 350 in FIG. 16A.

Figure 16B:
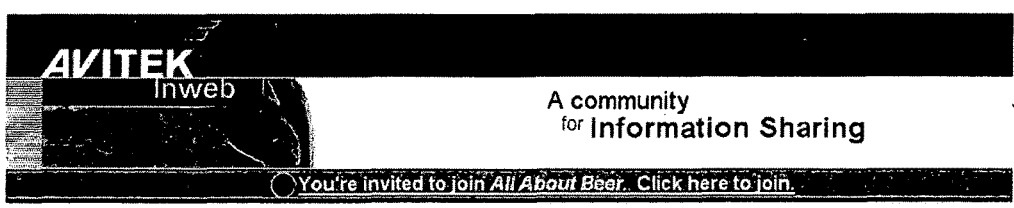

Step 2: A Community Manager has added the Community Member to a community, triggering the invitation notification. The Community Member can see this invitation via the RichUI-enabled header, as shown 352 in FIG. 16B.

Step 3: The Community Member elects to join the community by clicking on the link displayed. This scenario is continued in the Community Member joins an existing community section.

IM Notification

In this scenario the community can provide support for notification via instant messaging (IM). The Community Member has elected to use that notification mechanism and is currently present, which is to say that they are known to the system. Interesting events are sent to the Community Member via IM, such as being invited to join a community. The Community Member can use the following steps when being invited to join a community:

Step 1: The Community Member is known by the system and has elected to use IM as the means for receiving notifications of interesting events such as being invited to join a community.

Figure 17A:
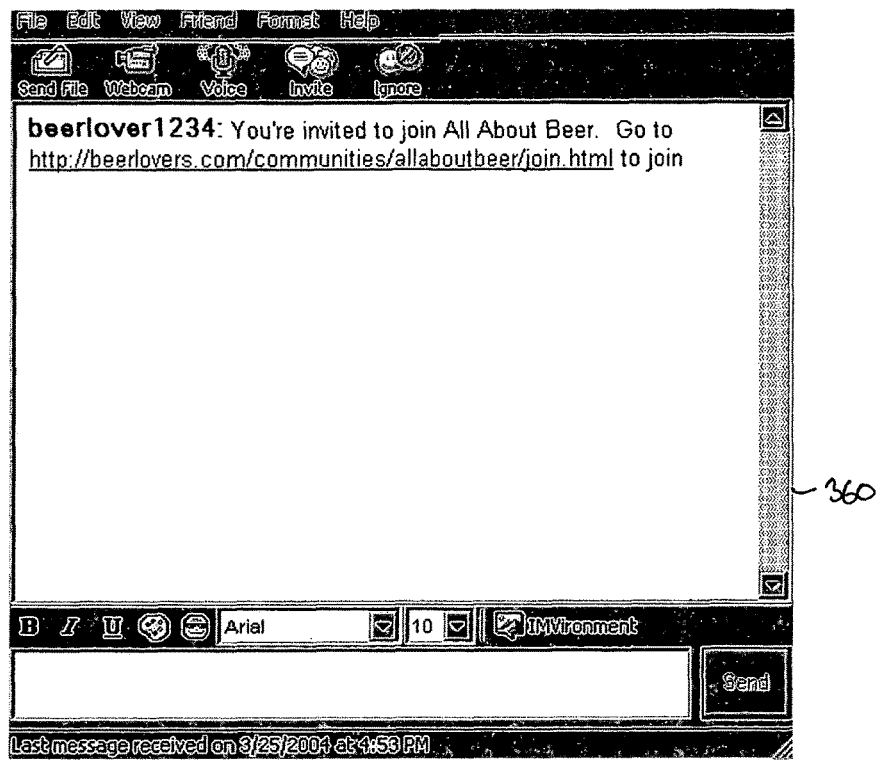
FIGS. 17A-B illustrate an IM message invitation to the community.
Figure 17B:
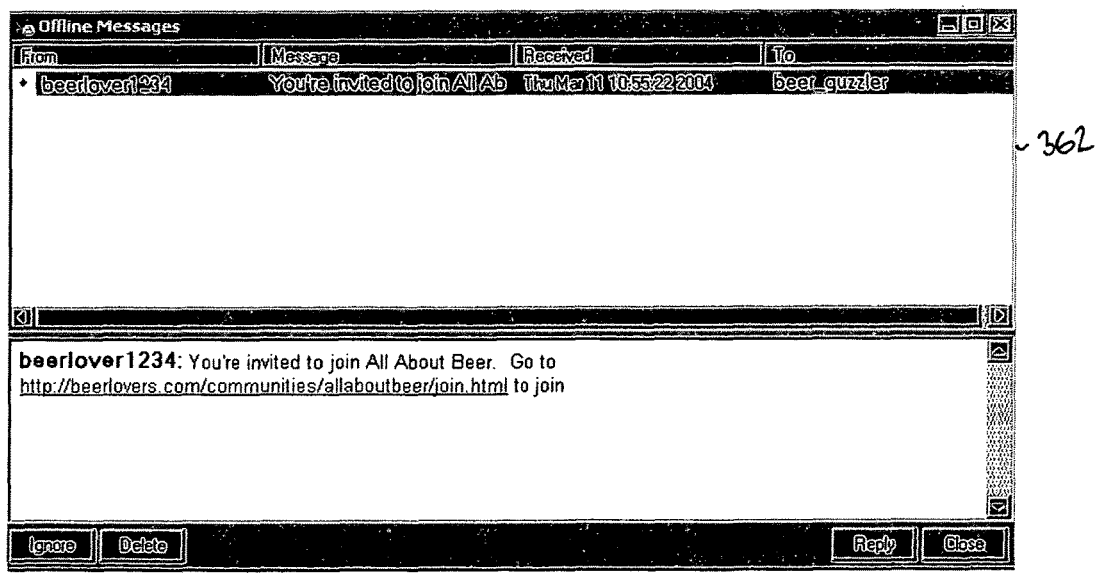

Step 2: A Community Manager has added the Community Member to a community, triggering the invitation notification. The Community Member can receive an online or offline message on the IM client, as shown 360, 362 in FIGS. 17A-17B.

Step 3: The Community Member can elect to join the community by clicking on the link displayed. This scenario is continued in the Community Member joins an existing community section.

Community Member Receives an Email Inviting them to Join a Community

In this scenario the Community Member can receive an email notification of an invitation to join a new community. This may result from one of the following events:

The Community Member has elected to use email as their primary notification mechanism.

The Community Member has elected to always receive email notifications, even if another mechanism is the default.

The Community Member has elected to receive email as the secondary (backup) mechanism and the timeout or other condition is true.

The Community Member can use the following steps when being invited to join a community:

Step 1: The Community Member has elected to receive email notification for interesting events such as being invited to join a community. This may be their primary, secondary, or default means of notification of such events.

Figure 18:
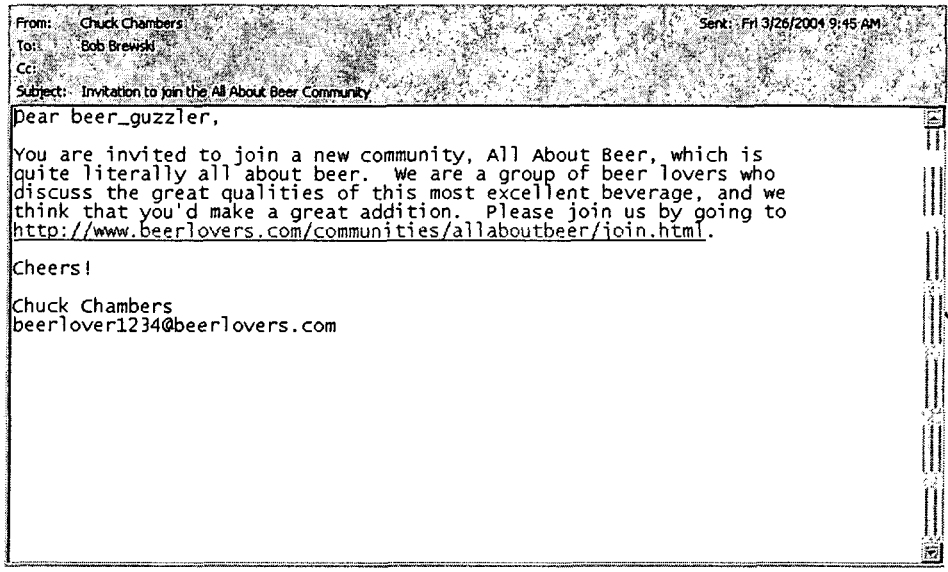
FIG. 18 illustrates an email invitation to the community.

Step 2: A Community Manager has added the Community Member to a community, triggering the invitation notification. The Community Member receives an email 370, as in FIG. 18.

Step 3: The Community Member elects to join the community by clicking on the link displayed. This scenario is continued in the Community Member joins an existing community section.

Community Member is Otherwise Notified of an Invitation to Join a Community

In this scenario a portal customer has provided a custom mechanism for event notifications that is distinct from the default supported scenarios. The notification are sent via the custom mechanism, but the invitee ultimately joins using the same mechanism as the others, as outlined in the Community Member joins an existing community section.

Community Member Joins an Existing Community

In this use case, a user has been invited to join a community and takes action to complete the process. The web-centric nature of communities implies an HTML-based mechanism for joining the community, no matter what the notification mechanism used. This use case is related to the Community Member receives an invitation to join a community use case in the previous section.

There are two variations on this use case to cover the types of users, those who are internal and already known to the system and those who are external and unknown to the system. Note that this terminology relates to the system only and has no implications for the physical location or other status of these users.

Internal Users

In this scenario, an internal user has received an invitation to join a community, as described in the previous section. The user has opened a browser and navigated to the link provided in the invitation, which is a confirmation page welcoming them to the community. These users are already known to the system and therefore do not have to go through the same registration process as external users.

The Community Member will use the following steps when joining a community:

Step 1: The Community Member has clicked on a link in a notification sent to them inviting them to join a community, which takes them to a confirmation screen.

Step 2: The Community Member either accepts or declines the invitation to join. If they decline, they receive a message indicating that they may join at a later date using the same URL. If they accept, they are taken to the community.

External Users

In this scenario an external user has received an invitation to join a community, as described in the previous section. The user has opened a browser and navigated to the link provided in the invitation, which is a registration page for joining the community. These users are not known to the system and must go through a registration process before being allowed to join the community.

Figure 19A:
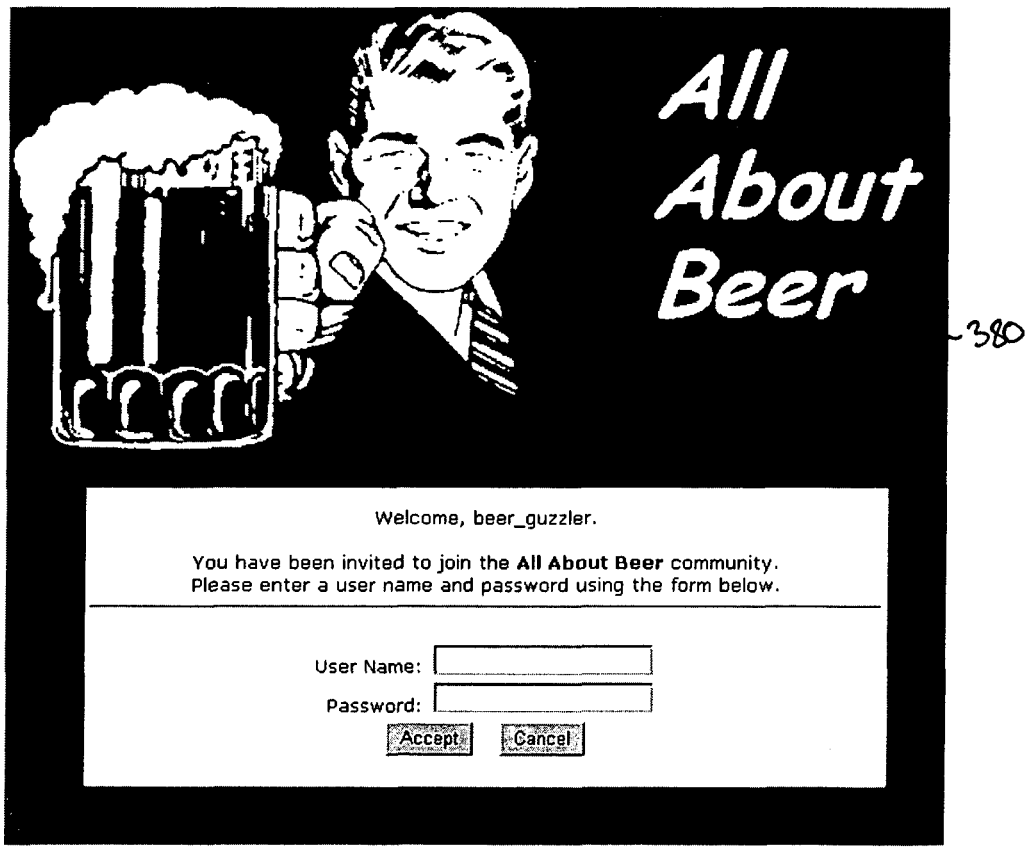
FIG. 19A-B illustrate a community portal pages.

The Community Member will use the following steps when joining a community:

Step 1: The Community Member has clicked on a link in a notification sent to them inviting them to join a community, which takes them to a registration screen 380 as shown in FIG. 19A.

Figure 19B:
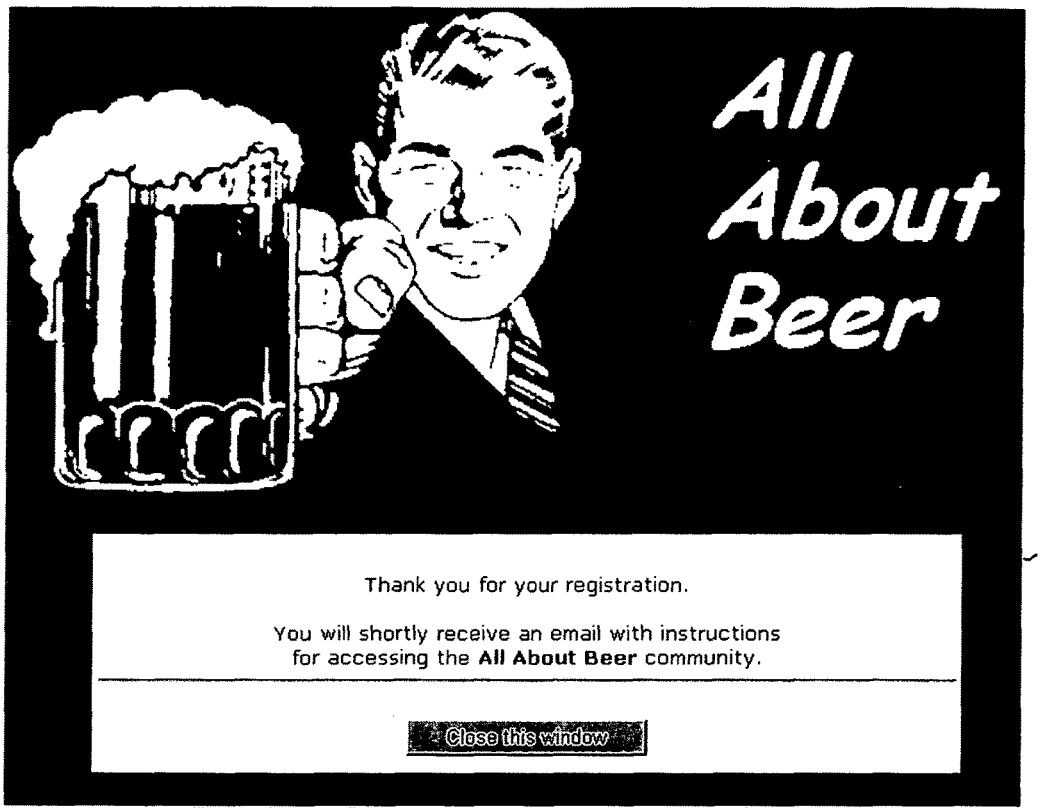

Step 2: The Community Member enters the user name and password and is registered by the system. They are instructed that a confirmation email will be sent to them, as shown 390 in FIG. 19B.

Figure 20:
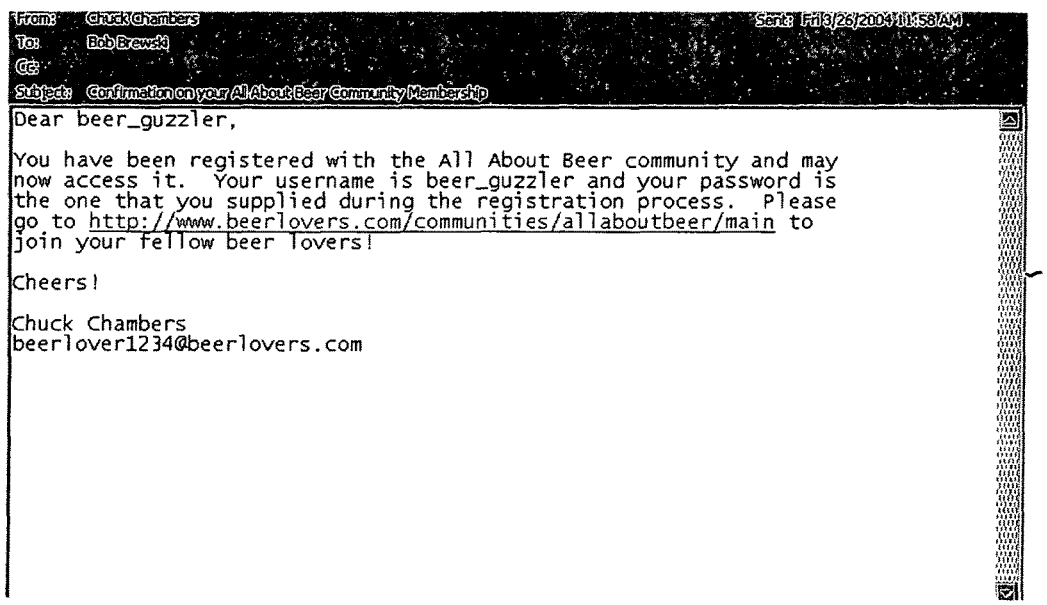
FIG. 20 illustrates a community link email.

Step 3: The Community Member receives the confirmation email indicating that their registration has been accepted, and providing a link to the community, as shown 392 in FIG. 20.

Step 4: The Community Member opens a browser and navigates to the community, where they are asked to login.

Step 5: The Community Member logs in and is taken to the community.

Communities Membership Manager

The Communities Membership Manager can be responsible for maintaining all persistent information regarding Community users and their inclusion in one or more Community instances. This includes basic extra user information required for Communities, such as the system user id, a primary email address and current active status, a set of information detailing the Community instances the user is registered with and a set of associated messaging id's that the Communities framework can use to contact the user for invitations or notifications.

The external API of the Communities Membership Manager can be exposed as a Stateless Session EJB, as well as a collection of value objects that represent constructs such as a Community Member, Community Membership and Messaging Id's. This Stateless Session EJB can use JDBC to access and manage a set of database tables that are used to persist the membership information.

Consumers of the Communities Membership Manager include the overall Communities Manager, the Portal runtime framework and the various admin and visitor tools that are used to manage Community Membership information.

CommunityMemberManager Interface

Figure 21:
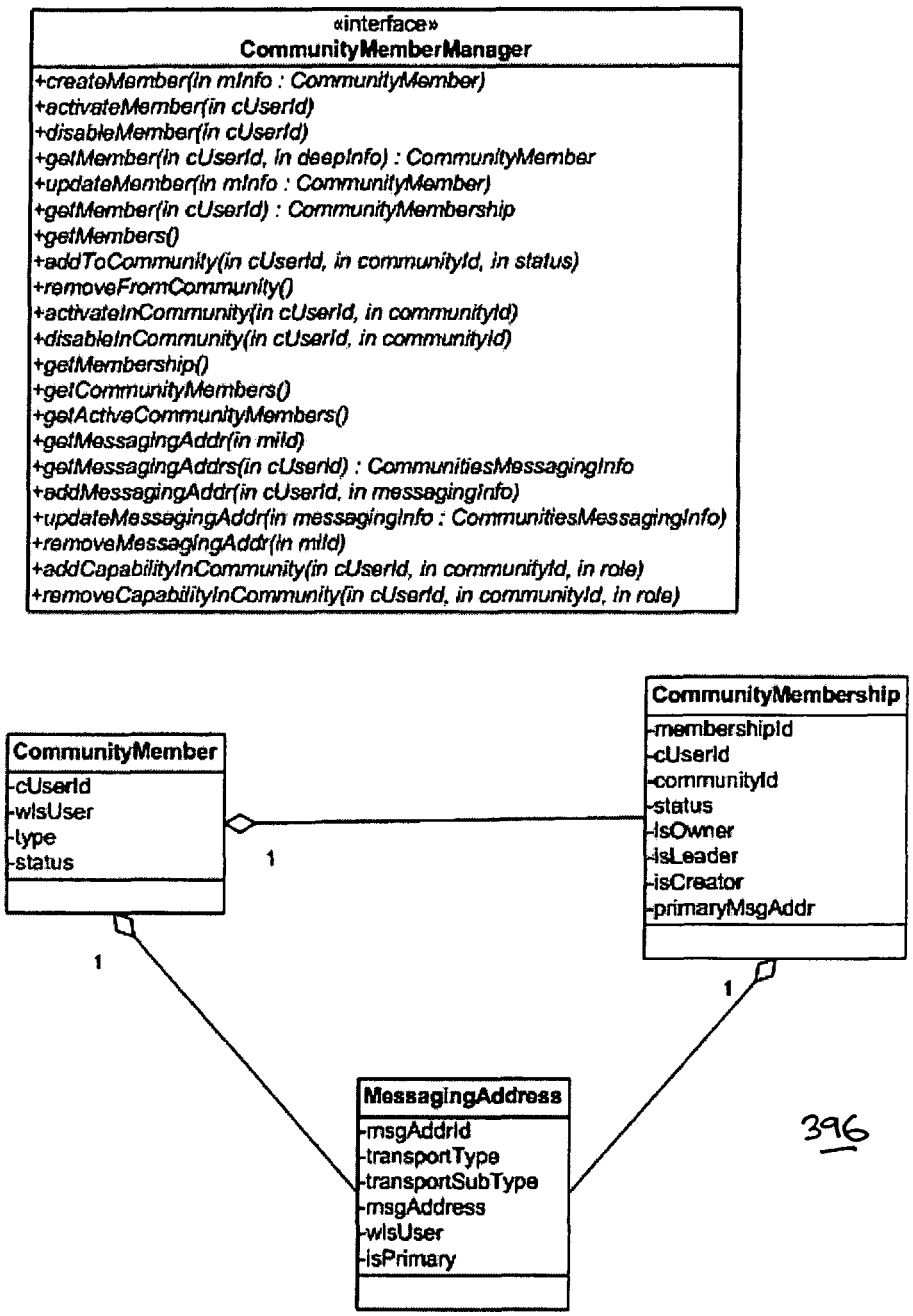
FIG. 21 illustrates the community member manager interface.

The methods on the CommunityMemberManager interface can be grouped into four main groups: member management, membership management, membership role management and messaging id management. FIG. 21 illustrates the community member manager interface 396.

Member Management

The member management methods can allow for creation, modification and status maintenance of users who are defined as participating in one or more Community. These methods can include:

CommunityMember createMember(CommunityMember mInfo): creates a new CommunityMember based on the supplied CommunityMember object, which includes at minimum either a WLS username for normal Community members, or a primary email address for external members who have been invited, but have not yet registered and been allocated a WLS username.

CommunityMember getMember(String username, Boolean deepInfI): returns a CommunityMember object populated with member information for the member specified by the WLS username or the primary email address, if the member exists. If deepInfo is true, the CommunityMember object will also contain references to all CommunityMembership, CommuntyRole and MessagingId information for that user.

Pagingiterator getMembers(QueryCriteria q): returns a PagingIterator that can be used to iterate through one or more pages of CommunityMember objects CommunityMember updateMember(CommunityMember mInfo): updates a CommunityMember entry disableMember(CUserId cUserId): disables a CommunityMember globally for all communities reactiveMember(CUserId cUserId): re-enables a CommunityMember globally for all communities who has been previously disabled Membership Management The membership management methods can allow for adding, removing and updating existing community members to specific Community. These methods include:

addToCommunity(CUserId cUserId, CID communityId): adds a community member specified by a CommunityMemberId to a Community specified by a CommunityId.

removeFromCommunity(CUserId cUserId, CID communityId): removes a community member from the Community specified by CommunityId.

disableInCommunity(CUserId cUserId, CID communityId): disables a community member within a single community. Users are not actually removed from a community, only disabled by setting their status to DISABLED.

activateInCommunity(CUserId cUserId, CID communityId): activates a community member within a single community, either upon user registration or for the purpose of re-enabling a user in a community after they have been disabled.

getMembership(CUserId cUserId, CID communityId): retrieves the membership record for a user in a community, if the user actually is a member of the specified community.

PagingIterator getCommunityMembers(CID communityId, QueryCriteria q): retrieves a list of all members of a community, regardless of active/disabled status.

PagingIterator getActiveCommunityMembers(CID communityId, QueryCriteria q): retrieves a collection of active status community members.

Community Capability Management

The capability management methods can allow for adding, removing and accessing the community capabilities held by a community member. These capabilities include COMMUNITY_OWNER, COMMUNITY_LEADER, COMMUNITY_MEMBER. These methods can include:

addCapability(CUserId cUserId, CID communityId, int capability): creates a CommunityCapability entry for a community member for a specific community removeCapability(CUserId cUserId, CID communityId, int capability): removes a CommunityCapability entry for a community member for a specific community.

Community Messaging Info Management

Each member in a community can be associated with more than one messaging id that can be used to send invitation or other messages from the community. All external users will have a primary email address as part of their CommunityMember data. Each community messaging info object is composed of a reference to a transport definition and the actual id on that transport. A transport definition contains a primary transport type (such as email or IM) and an optional secondary transport type (such as IM type). These transport definitions can be a configurable property of the Communities Messaging Manager and are not fixed enumerations to allow for a variety of installation configurations. The messaging info management methods can include:

addMessagingInfo(CUserId cUserId, MessagingInfo m): adds a MessagingInfo to the set of id's associated with the specified communities user MessagingInfo getMessagingInfo(CUserId cUserId, MessagingType t): returns a MessagingInfo corresponding to specified MessagingType if it exists Collection getMessagingInfos(CUserId cUserId): retrieves all of the MessagingInfo's for the specified communities member MessagingInfo updateMessagingInfo(CUserId cUserId, MessagingInfo m): updates a MessagingInfo entry associated with a communities user MessagingInfo removeMessagingInfo(CUserId cUserId, MessagingInfo m): removes a MessagingInfo from the set of id's associated with the specified communities user The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of an embodiment of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for developing a collaboration community portal web application for use in a computer portal environment, comprising:
    a computer server comprising computer server software and a microprocessor;
    a portal component library stored on the computer server, wherein the portal component library includes a plurality of community portal templates and community portal elements, wherein the community portal elements, include a plurality of pages and a plurality of portlets, and wherein each community portal template specifies a selection of community portal elements together with a standardized look-and-feel, layout, and components for that portal template, to be used as part of the portal applications;
    a notification service operating on the computer server, wherein the notification service is configured to enable each of the portal applications and portlets therein to register with the notification service to produce and consume notifications and to communicate, to its associated community members, notifications of changes that occur within the portal application, by various communication methods including email, internet messaging, or html specified for each member;
    a community context operating on the computer server, wherein the community context comprises an application programming interface (API) that provides an indication of members of a collaboration community accessible to said plurality of portlets via said API such that the plurality of portlets have capabilities and behaviors which depend upon the community context; and
    a community portal development tool operating on the computer server, wherein the community portal development too is configured to enable community portal developers to select from, and use the community portal templates to create the collaboration community portal web application to facilitate constructing said collaboration community portal web application from the community context and the plurality of community portal elements to include a plurality of said pages and a plurality of said portlets;
    whereby the community portal development tool is configured to develop the portal applications such that the portal applications each present multiple portlet views within a single web interface simultaneously and wherein said multiple portlet views depend upon the community context accessed via said API; and
    whereby the collaboration community portal web application is configured for use by and associated with said collaboration community, and has the look-and-feel, layout, and components of its associated portal template.

2. The system of claim 1, wherein the indication is a pointer to a list of members.

3. The system of claim 1, wherein the indication is a list of members.

4. The system of claim 1, wherein each portlet of the plurality of portlets is implemented as a Java server page referenced by metadata in the portal application.

5. The system of claim 1, wherein:
    one or more of the plurality of portlets is implemented as a Java server page (JSP); and
    wherein said one or more of the plurality of portlets utilizes the community context via one of Java scriptlets and JSP tags.

6. The system of claim 1, wherein the community context comprises a Java API which provides access to said indication of members of a collaboration community accessible to said plurality of portlets.

7. The system of claim 1, wherein the community context is used to enable titlebars of one or more portlets to display symbols to a member based on whether other members are online.

8. The system of claim 1, wherein the API of the community context defines functions which provide access to community identification, community membership, community lifecycle, and meta-information specific to the collaboration community.

9. The method of claim 1, wherein notifications are sent to community members who have subscribed to receive notifications when collaboration community portal web application content is changed.

10. The system of claim 1, wherein the system includes a notification table that contains an entry for each user for each notification, and wherein a payload and other characteristics of the notification that are identical for each user is stored only once per notification to minimize redundancy.

11. The system of claim 1, wherein for each notified user, a particular notification contains a namespace, name, scope, payload and time-to-live specified by the producer, and wherein the particular notification can remain active until explicitly consumed by recipient, or until the time-to-live specified in the notification expires.

12. A method for supporting development of a collaboration community portal web application for use in a computer portal environment on a computer server comprising computer server software and a microprocessor, comprising the steps of:

providing a portal component library stored on the computer server that includes a plurality of community portal templates and community portal elements, wherein the community portal elements, include a plurality of pages and a plurality of portlets, and wherein each community portal template specifies a selection of community portal elements together with a standardized look-and-feel, layout, and components for that portal template, to be used as part of the collaboration community portal web application;

providing a notification service operating on the computer server, wherein the notification service is configured to enable each of the portal applications and portlets therein to register with the notification service to produce and consume notifications and to communicate, to its associated community members, notifications of changes that occur within the collaboration community portal web application, by various communication methods including email, internet messaging, or html specified for each member;

providing a community context operating on the computer server, wherein the community context comprises an application programming interface that provides an indication of members of a collaboration community accessible to said plurality of portlets via said API such that the plurality of portlets have capabilities and behaviors which depend upon the community context; and providing a community portal development tool operating on the computer server, wherein the community portal development too is configured to enable community portal developers to select from, and use the community portal templates to create a plurality of portal applications;

wherein the community portal development tool is configured to facilitate constructing the collaboration community portal web application from the community context and the community portal elements including a plurality of said pages and a plurality of said portlets;

whereby the community portal development tool is configured to develop the collaboration community portal web application such that the collaboration community portal web application presents multiple portlet views within a single web interface simultaneously and wherein said multiple portlet views depend upon the community context accessed via said API, and thereby creating a collaboration community portal web application which is configured for use by and associated with said collaboration community, and has the look-and-feel, layout, and components of its associated portal template, and wherein each member of the community as indicated by the community context thereafter receives the notifications via the notification service and communication method specified for that member.

13. The method of claim 12, wherein the indication is a pointer to a list of members.

14. The method of claim 12, wherein the API of the community context defines functions which provide access to community identification, community membership, community lifecycle, and meta-information specific to the collaboration community.

15. The method of claim 12, further comprising implementing each portlet of the plurality of portlets as a Java server page referenced by metadata in collaboration community portal web application.

16. The method of claim 12, further comprising:
implementing one or more of the plurality of portlets as a Java server page referenced by metadata in collaboration community portal web application;
wherein said one or more of the plurality of portlets utilizes the community context via one of Java scriptlets and JSP tags.

17. The method of claim 12, further comprising providing a Java API for the community context wherein the Java API provides access to said indication of members of a collaboration community accessible to said plurality of portlets.

18. The method of claim 12, further comprising utilizing the community context to enable titlebars of one or more portlets to display symbols to a member based on whether other members are online.

19. The method of claim 12, further comprising providing a notification table that contains an entry for each user for each notification, and wherein a payload and other characteristics of the notification that are identical for each user is stored only once per notification to minimize redundancy.

20. A computer system for developing a collaboration community portal web application for use in a computer portal environment by a collaboration community, the computer system comprising:
a computer server comprising one or more microprocessor and server software operating on said one or more microprocessor;
a portal component library stored on the computer server, wherein the portal component library, includes a plurality of community portal templates and community portal elements, wherein the community portal elements, include a plurality of pages and a plurality of portlets, and wherein each community portal template specifies a selection of community portal elements together with a standardized look-and-feel, layout, and components for that portal template, to be used as part of the community portal web application;
a notification service operating on the computer server, wherein the notification service is configured to enable each of the plurality of portlets to register with the notification service to produce and consume notifications, and to communicate, to members of the collaboration community, notifications of changes that occur within the collaboration community portal web application;
a community context operating on the computer server, wherein the community context comprises an application programming interface that provides an indication of the members of a collaboration community accessible to said plurality of portlets via said API such that the plurality of portlets have capabilities and behaviors which depend upon the community context; and
a community portal development tool operating on the computer server, wherein the community portal development too is configured to enable community portal developers to select from, and use the community portal templates to create the collaboration community portal web application, and wherein the community portal development tool is configured to facilitate constructing said collaboration community portal web application from the community context and the plurality of community portal elements;
whereby the community portal development tool is configured to develop said collaboration community portal web application such that the collaboration community portal web application presents multiple portlet views within a single web interface simultaneously and wherein said multiple portlet views depend upon the community context accessed via said API; and whereby the collaboration community portal web application is configured for use by and associated with said collaboration community, is configured to present multiple portlet views within a single web interface, and has the look-and-feel, layout, and components of its associated portal template.

* * * * *

UNITED STATES PATENT AND TRADEMARK OFFICE
CERTIFICATE OF CORRECTION

PATENT NO.      : 9,665,833 B2
APPLICATION NO. : 11/388606
DATED           : May 30, 2017
INVENTOR(S)     : Smith et al.

Page 1 of 2

It is certified that error appears in the above-identified patent and that said Letters Patent is hereby corrected as shown below:

In the Specification

In Column 2, Line 12, delete "FIG." and insert -- FIGS. --, therefor.

In Column 2, Line 36, delete "FIG." and insert -- FIGS. --, therefor.

In Column 12, Line 59, after "community" insert -- . --.

In Column 19, Line 13, delete "work space" and insert -- workspace --, therefor.

In Column 19, Line 14, delete "desk top" and insert -- desktop --, therefor.

In Column 20, Line 20, delete "portal" and insert -- .portal --, therefor.

In Column 20, Line 59, delete "us be" and insert -- use --, therefor.

In Column 21, Line 47, after "added" insert -- . --.

In Column 22, Line 15, Delete "querry" and insert -- query --, therefor.

In Column 23, Line 49, delete "explicity" and insert -- explicitly --, therefor.

In Column 24, Line 48, delete "NotificationManagerAPI." and insert -- NotificationManager API. --, therefor.

In Column 25, Line 66, delete "NoticiationService" and insert -- NotificationService --, therefor.

In Column 26, Line 45, delete "DesktopDefinitionld" and insert -- DesktopDefinitionId --, therefor.

Signed and Sealed this
Twentieth Day of February, 2018

Andrei Iancu
*Director of the United States Patent and Trademark Office*

CERTIFICATE OF CORRECTION (continued)
U.S. Pat. No. 9,665,833 B2

In Column 26, Line 46, delete "DesktopInstanceId" and insert -- DesktopInstanceId --, therefor.

In Column 27, Line 54, delete "existingAPIsthat" and insert -- existing APIs that --, therefor.

In Column 28, Line 41, delete "TemplateResouceId" and insert -- TemplateResourceId --, therefor.

In Column 28, Line 43, delete "DesktopInstanceId," and insert -- DesktopInstanceId, --, therefor.

In Column 33, Line 52, delete "CommuntyRole" and insert -- CommunityRole --, therefor.

In the Claims

In Column 36, Line 1, in Claim 1, delete "too" and insert -- tool --, therefor.

In Column 37, Line 32, in Claim 12, delete "too" and insert -- tool --, therefor.

In Column 38, Line 55, in Claim 20, delete "too" and insert -- tool --, therefor.